United States Patent [19]
Okamoto et al.

[11] Patent Number: 6,125,438
[45] Date of Patent: Sep. 26, 2000

[54] DATA PROCESSOR

[75] Inventors: Tadashi Okamoto; Hiroshi Kadota; Yoshiteru Mino, all of Osaka, Japan

[73] Assignee: Matsushita Electrical Industrial Co., Ltd., Osaka, Japan

[21] Appl. No.: 09/063,009

[22] Filed: Apr. 21, 1998

[30]     Foreign Application Priority Data

Apr. 21, 1997   [JP]   Japan ................................... 9-103164

[51] Int. Cl.[7] .................................................. G06F 15/00
[52] U.S. Cl. .............................................. 712/43; 712/35
[58] Field of Search .............................. 712/222, 42, 43, 712/35; 708/425, 301

[56]              References Cited

U.S. PATENT DOCUMENTS

| | | | |
|---|---|---|---|
| 4,782,458 | 11/1988 | Bhattacharya et al. . | |
| 4,783,783 | 11/1988 | Nagai et al. ................................ | 714/17 |
| 4,881,192 | 11/1989 | Woudsma et al. . | |
| 4,947,363 | 8/1990 | Williams .................................. | 708/322 |
| 5,166,895 | 11/1992 | Makino .................................... | 708/319 |
| 5,572,453 | 11/1996 | Miyake et al. ........................... | 708/521 |
| 5,623,616 | 4/1997 | Vitale et al. ............................. | 712/222 |
| 5,680,335 | 10/1997 | Ikeyama et al. ......................... | 708/319 |
| 5,920,899 | 7/1999 | Chu ......................................... | 711/169 |
| 5,987,185 | 11/1999 | Suzuki .................................... | 382/263 |

FOREIGN PATENT DOCUMENTS

| | | |
|---|---|---|
| 02201686 | 8/1990 | Japan . |
| 07028642 | 1/1995 | Japan . |

*Primary Examiner*—Larry D. Donaghue
*Attorney, Agent, or Firm*—McDermott, Will & Emery

[57]              ABSTRACT

A data processor of the invention includes plural memories, plural arithmetic units, a data transfer unit and a network. The data transfer unit transfers various data to predetermined memories, and switches the connections between the memories and the arithmetic units by using the network. The control unit adds a processability judgement signal to a data read from a predetermined memory in reading the data, so as to make a pair of the data and the processability judgement signal. Each of the arithmetic units receives the data and the processability judgement signal, conducts predetermined processing on the received data, delays the received processability judgement signal by the number of cycles equal to its own processing cycle, and outputs resultant data obtained through the processing and the delayed processability judgement signal. Accordingly, in storing ultimate resultant data in a predetermined storage unit, the storage unit stores the ultimate resultant data as effective data on the basis of the processability judgement signal added to the resultant data. The data processor attains wide application and can be applied to various types of multimedia applications by switching the connections between the memories and the arithmetic units by using the network.

21 Claims, 21 Drawing Sheets

Fig. 4

| Cycle | #0 | #1 | #2 | #3 | #4 | #5 ··· |
|---|---|---|---|---|---|---|
| Pointer 60 | 0 | 0 | 1 | 2 | 3 | 4 |
| Write pointer 62 | 0 | 100 | 100 | 100 | 100 | 100 |
| Executability judgement signal 72 (270) | 0 | 1 | 1 | 1 | 1 | 1 |
| Data line 32 (324) | XXX | a[0], b[0], c[0] | a[1], b[1], c[1] | a[2], b[2], c[2] | a[3], b[3], c[3] | a[4], b[4], c[4] |
| Executability judgement signal 144 | 0 | 0 | 1 | 1 | 1 | 1 |
| Data line 34 | XXX | XXX | a[0]*b[0] c[0] | a[1]*b[1] c[1] | a[2]*b[2] c[2] | a[3]*b[3] c[3] |
| Executability judgement signal 150 (276) | 0 | 0 | 0 | 1 | 1 | 1 |
| Data line 36 (322) | XXX | XXX | XXX | a[0]*b[0] +c[0] | a[1]*b[1] +c[1] | a[2]*b[2] +c[2] |
| Write pointer 162 | 0 | 0 | 0 | 0 | 1 | 2 |

Fig. 21

DATA PROCESSOR

BACKGROUND OF THE INVENTION

The present invention relates to a data processor. More particularly, it relates to improvement of a data processor including plural memories and plural arithmetic means for controlling and processing mass data.

A conventional data processor includes arithmetic units for addition, subtraction, multiplication and division, and a hardware engine working as a circuit dedicated to the processor. The hardware engine is, as is disclosed in U.S. Pat. No. 4,782,458 titled "Architecture for Power of Two Coefficient FIR Filter", an arithmetic circuit constructed according to the purpose of the processor and a processing speed required for the purpose. U.S. Pat. No. 4,881,192 titled "One-dimensional Linear Picture Transformer" describes, as the hardware engine, a dedicated circuit in which a network including plural buses and plural arithmetic units are aligned and combined for realizing predetermined processing.

Recently, in accordance with the development of LSI techniques, a processor has been provided with not only conventionally known instructions but also new instructions. For example, in a processor such as Pentium II manufactured by Intel, which is provided with a new instruction designated as a "multimedia instruction", arithmetic units used therein have attained more and more improved features, and such a processor can execute various processing such as image processing and speech processing without using the hardware engine at a certain processing speed. The hardware engine is necessary, however, when a high processing speed is required.

A recent processor including plural memories, plural arithmetic units and a network, namely, a processor designated as a "media processor" such as Mpact manufactured by Chromatic Research and Trimedia manufactured by Philips, has become able to realize plural types of processing (multimedia processing), such as two types processing of image processing and speech processing, at a high speed. Such a media processor for executing, for example, the two types of processing of image processing and speech processing, is required to be provided with a hardware engine in accordance with these processing and a desired processing speed.

However, a media processor for executing, for example, the image processing and the speech processing includes a hardware engine different from that of a media processor for executing other plural processing. Accordingly, plural media processors for executing different processing include different hardware engines correspondingly to their executable processing, and there arises a problem that a variety of types of processors are required to be designed.

SUMMARY OF THE INVENTION

An objective of the invention is providing a data processor applicable to a variety of multimedia applications by making the data processor widely applicable as a media processor without designing various types of processors.

In order to accomplish this objective, the data processor of this invention includes a plurality of memories, a plurality of arithmetic units and a network, so as to switch connections between the memories and the arithmetic units differently depending upon processing to be conducted, and to effectively process data flowing therethrough.

Specifically, the data processor of the present invention includes: a data storage unit for storing data therein; a plurality of arithmetic units; a network for switching connections between the data storage unit and the arithmetic units; a control unit for outputting, in reading the data stored in said data storage unit, an effective data specifying signal representing that the read data is effective; and a delay circuit for receiving the effective data specifying signal from the control unit and delaying the received effective data specifying signal by the same number of cycles as a number of cycles passed through after the data has been read from the data storage unit and until processing results are obtained in at least one of the arithmetic units.

Also, in the data processor of this invention, the delay circuit includes a plurality of delay parts respectively corresponding to the plurality of arithmetic units. Each of the delay parts delays the effective data specifying signal by the same number of cycles as a number of cycles required for an associated one of the arithmetic units to perform processing and outputs the delayed signal.

Accordingly, in this invention, when data is read from the data storage unit, the effective data specifying signal is added to the read data. When the data is processed by the arithmetic units and the resultant data is stored in the data storage unit, the effective data specifying signal is also simultaneously input to this data storage unit. Therefore, even when the number of processing stages is varied, the resultant data can be identified as effective data and can be stored in the data storage unit.

BRIEF DESCRIPTION OF THE DRAWINGS

Preferred embodiments of the invention are illustrated in accompanying drawings in which:

FIG. 4 is an explanatory diagram for showing data values at respective members in the principle;

FIG. 19($b$) is a flowchart for showing the operation of a second control unit in the data processor of the third embodiment;

FIG. 21 is an explanatory diagram for showing data values at other members of the data processor of the third embodiment in the data flow of FIG. 17.

DETAILED DESCRIPTION OF THE INVENTION

The preferred embodiments of the present invention will now be described with reference to the accompanying drawings.

EMBODIMENT 1

Figure 1:
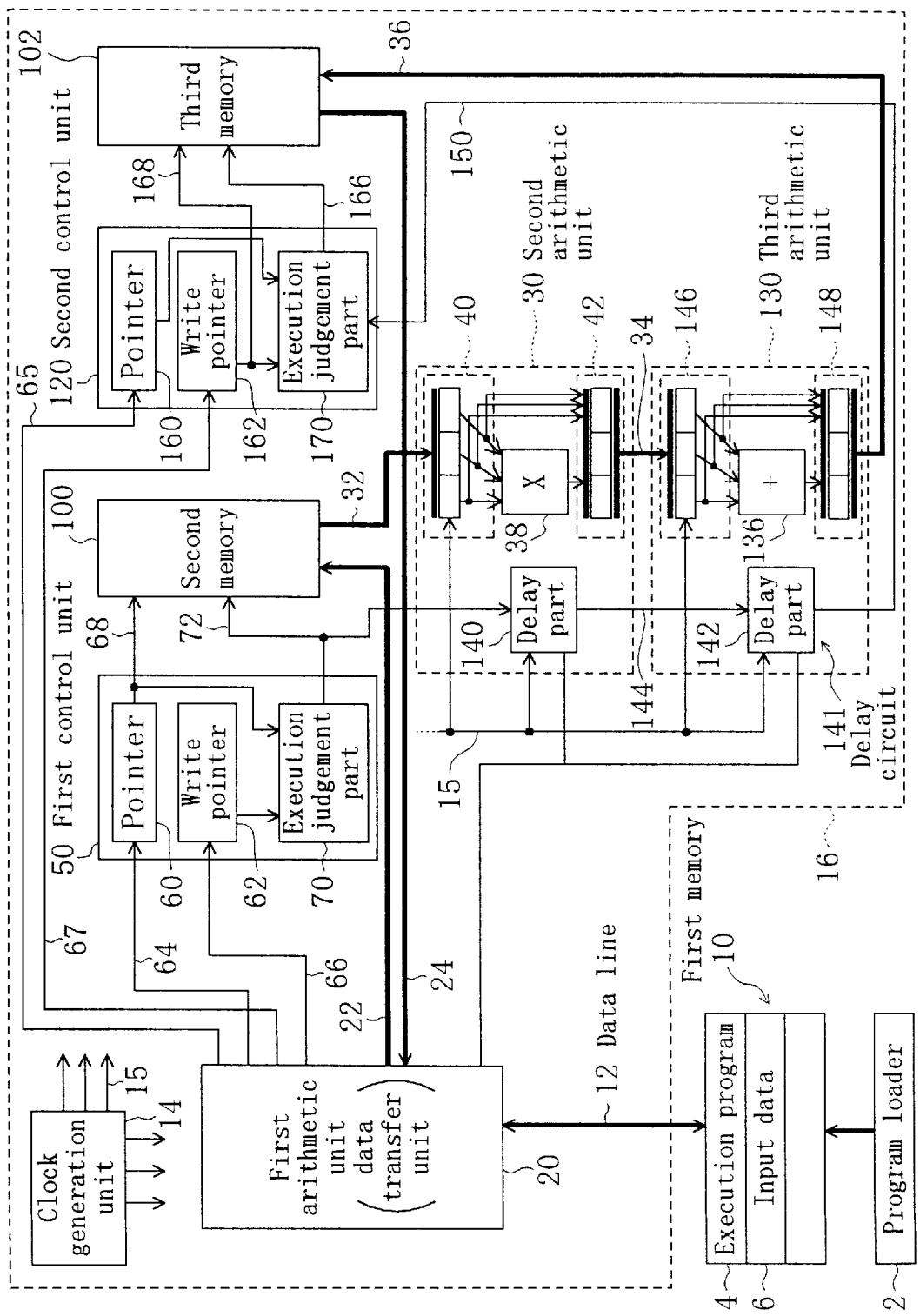
FIG. 1 is a diagram for showing the principle of a data processor according to a first embodiment of the invention.
Figure 2:
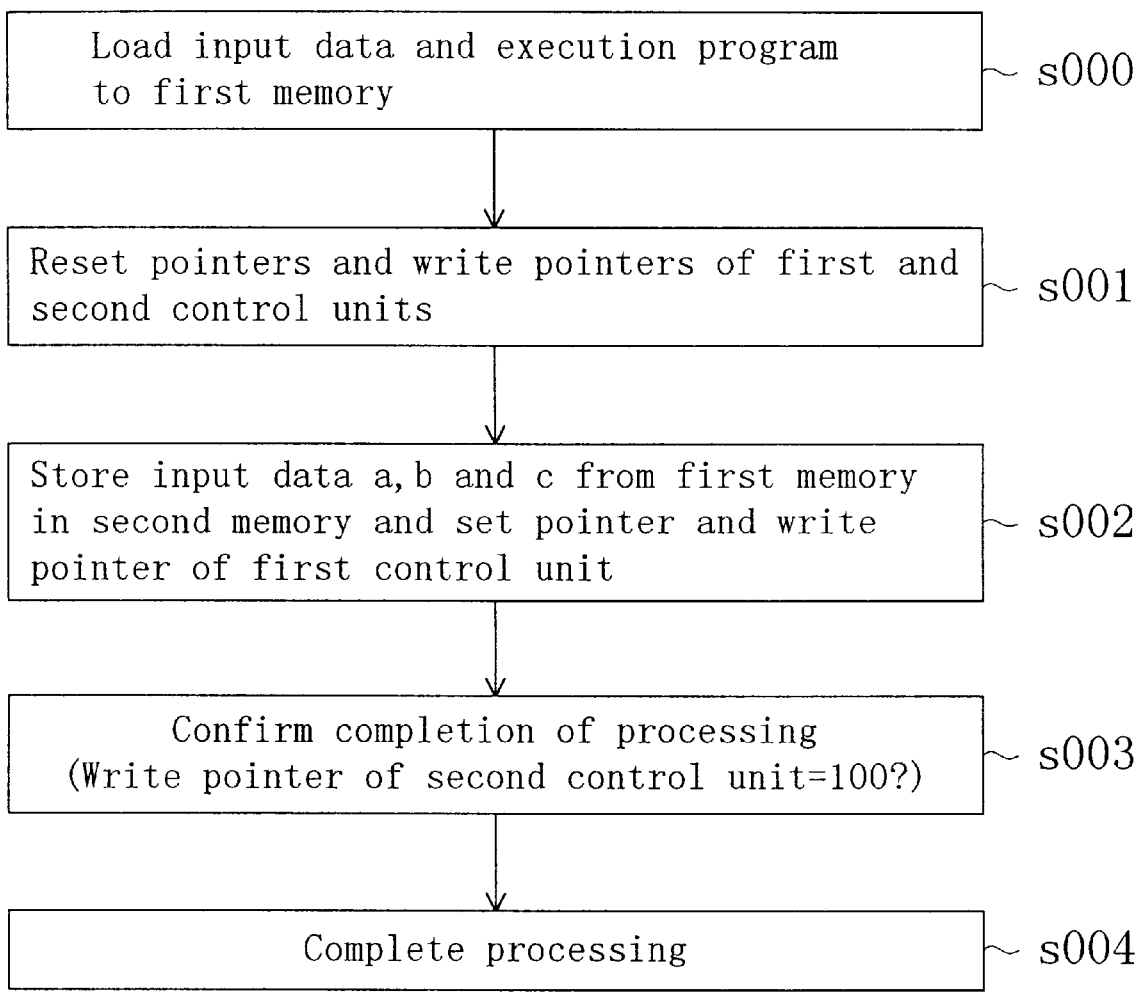
FIG. 2 is a flowchart for showing the operation of a first arithmetic unit in the principle of FIG. 1.
Figure 3A:
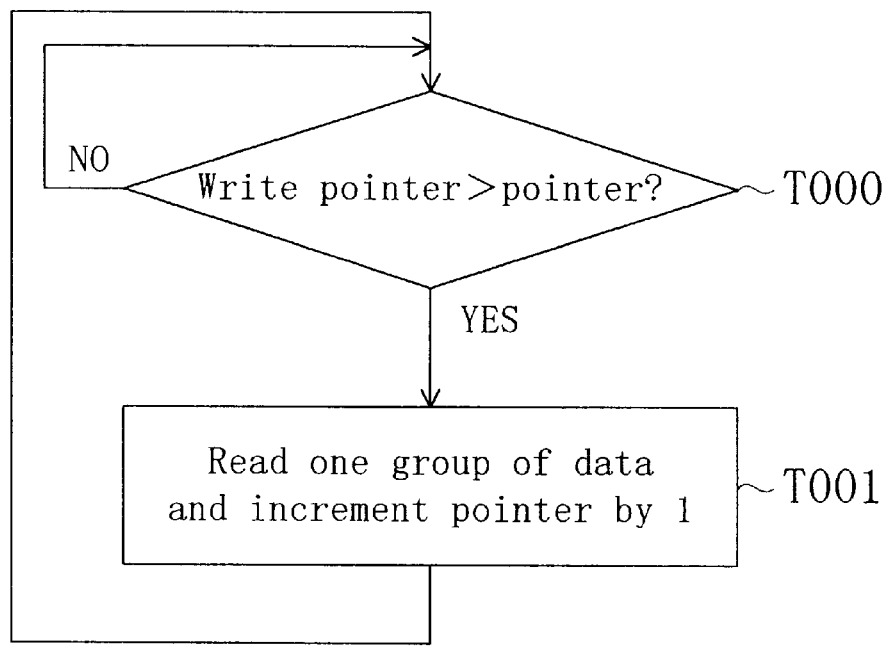
FIG. 3(a) is a flowchart for showing the operation of a first control unit in the principle.
Figure 3B:
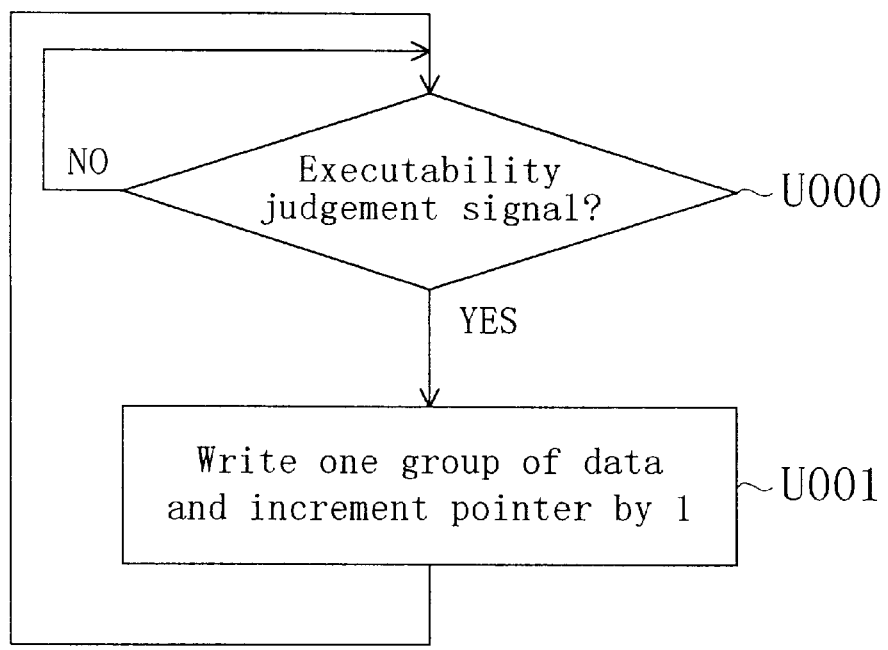
FIG. 3(b) is a flowchart for showing the operation of a second control unit in the principle.

FIG. 1 is a diagram for showing a data processor as a basic principle of the present invention. FIGS. 2, 3($a$) and 3($b$) are flowcharts for showing basic operations in the invention. FIG. 4 is a diagram for showing data values at respective members in the principle of the invention.

In the description of the principle shown in FIG. 1, execution of the following program will be described as an example: An element of an array a is multiplied by an element of an array b, an element of an array c is added to the result of the multiplication, and the result of the addition is stored as an element of an array d.
[Program 1]

```
#define DSIZE=100;
main(){
  int iii;
  int a[DSIZE],b[DSIZE],c[DSIZE],d[DSIZE];
    for(iii=0; iii<DSIZE; iii++){
      d[iii]=a[iii]*b[iii]+c[iii];
    }
}
```

In FIG. 1, a reference numeral 10 denotes a first memory (main data storage unit) for storing data externally provided to the processor. A reference numeral 16 denotes the data processor for processing the data, and a reference numeral 14 denotes a clock generation unit for supplying clocks to respective members. The clock generation unit 14 supplies a clock to the respective members of the data processor 16 through clock lines 15, and each member supplied with the clock conducts predetermined processing in each cycle in synchronization with the supplied clock.

A reference numeral 20 denotes a first arithmetic unit (data transfer unit) for receiving data from the first memory 10 externally provided to the data processor 16, processing the received data and transferring the received data to a second memory 100 (described below), and a reference numeral 12 denotes a data line for transferring data between the first memory 10 and the first arithmetic unit 20. It is herein premised that three arrays of data can be transferred through this data line 12.

A reference numeral 2 denotes a program loader for loading, in the first memory 10, an execution program 4 for instructing operations to be conducted by the first arithmetic unit 20 and the data processor 16 and input data 6 to be processed.

A reference numeral 100 denotes the second memory (data storage unit), and a reference numeral 22 denotes a data line for transferring data from the first arithmetic unit 20 to the second memory 100.

A reference numeral 50 denotes a first control unit (control unit) including a pointer 60 for pointing an address for reading data from the second memory 100, a write pointer 62 for pointing the number of words transferred from the first arithmetic unit 20 to be stored in the second memory 100, and a processability judgement part (judgement part) 70 for referring and comparing the values of the pointer 60 and the write pointer 62 so as to judge whether or not data can be read from the second memory 100.

A flow of the judgement by the processability judgement part 70 is shown in FIG. 3($a$). The processability judgement part 70 refers the pointer 60 and the write pointer 62 so as to confirm the presence of data in the second memory 100, and generates a processability judgement signal (effective data specifying signal) 72.

A reference numeral 64 denotes a pointer setting line for setting the pointer 60 of the first control unit 50 by the first arithmetic unit 20, and a reference numeral 66 denotes a write pointer setting line for setting the write pointer 62 of the first control unit 50 by the first arithmetic unit 20. A reference numeral 68 denotes an address line for reading the value of the pointer 60 of the first control unit 50 as an address in the second memory 100. A reference numeral 32 denotes a data line for transferring data read from the second memory 100 to a second arithmetic unit 30, and a reference numeral 72 denotes the processability judgement signal for informing the second memory 100 and the second arithmetic unit 30 of the processability.

In this case, the data line 32 outputs the three types of elements of the arrays a, b and c in each cycle, and when data to be processed are on this data line 32, the processability judgement signal 72 is, for example, set at "1", so as to indicate the presence of the data to be processed. Therefore, the data line 32 and the processability judgement signal 72 are output to the respective members as a pair in each cycle.

A reference numeral 30 denotes the second arithmetic unit (arithmetic unit), which includes a data latch 40 for receiving data of the data line 32 and holding the data in synchronization with a clock, a processability judgement signal latch (delay part) 140 for holding the processability judgement signal 72, a multiplication part (processing part) 38 for receiving the plural data of the data latch 40 and selecting some of the data for multiplication, and an output selector 42 for receiving resultant data obtained by the multiplication part 38 and the data from the data latch 40 and outputting some of the received data to a third arithmetic unit 130.

A reference numeral 34 denotes a data line for outputting data from the second arithmetic unit 30, and a reference numeral 144 denotes a processability judgement signal corresponding to processability judged by the second arithmetic unit 30.

A reference numeral 130 denotes the third arithmetic unit (arithmetic unit), which includes a data latch 146 for receiving data of the data line 34 transferred from the second arithmetic unit 30 and holding the received data in synchronization with a clock, a processability judgement signal latch (delay part) 142 for holding the processability judgement signal 144, an addition part (processing part) 136 for receiving the plural data of the data latch 146 and selecting some of the data for addition, and an output selector 148 for receiving resultant data obtained by the addition part 136 and the data of the data latch 146 and outputting some of the received data to a third memory 102.

The two processability judgement signal latches (delay parts) 140 and 142 together form a delay circuit 141.

A reference numeral 36 denotes a data line for outputting data from the output selector 148 of the third arithmetic unit 130, and a reference numeral 150 denotes a processability judgement signal corresponding to processability judged by the third arithmetic unit 130.

A reference numeral 102 denotes the third memory (another data storage unit), and a reference numeral 24 denotes a data line for transferring data from the third memory 102 to the first arithmetic unit 20.

A reference numeral 120 denotes a second control unit (another control unit), which includes a pointer 160, a write pointer 162 for pointing an address in the third memory 102 at which data is to be written, and a processability judgement part 170 for receiving the processability judgement signal 150 of the third arithmetic unit 130, judging whether or not data can be written in the third memory 102, and outputting a write instruction to the third memory 102 when it is determined that the data can be written.

A reference numeral 166 denotes a processability judgement signal output by the processability judgement part 170 corresponding to the writability in the third memory 102. A reference numeral 65 denotes a pointer setting line for setting and referring the pointer 160 of the second control unit 120 by the first arithmetic unit 20, and a reference numeral 67 denotes a write pointer setting line for setting and referring the write pointer 162 of the second control unit 120 by the first arithmetic unit 20. A reference numeral 168 denotes an address line for outputting the value of the write pointer 162 of the second control unit 120 as a write address in the third memory 102.

Now, the operation of the principle processor will be described with reference to FIGS. 1, 2, 3(a), 3(b) and 4.

(Prior to Cycle #0)

The execution program 4 and the input data 6 used in the principle data processor of this invention are previously generated by a compiler or an assembler to be stored in the first memory 10 by the program loader 2 [S000].

Specifically, the data of the input data arrays a, b and c are stored in the first memory 10 as the input data 6, and the execution program 4 includes a flow for the principle operation according to the invention.

At this point, an external processor or the like can be used as the program loader 2, which is not described in detail because it is not a main part of the invention.

The first arithmetic unit 20 receives the execution program 4 from the first memory 10, and initializes the pointer 60 and the write pointer 62 of the first control unit 50 to "0".

The first arithmetic unit 20 receives the execution program 4 from the first memory 10, and initializes the pointer 160 and the write pointer 162 of the second control unit 120 to "0" [S001].

Furthermore, the processability judgement part 70 of the first control unit 50 refers and compares the pointer 60 and the write pointer 62 in each cycle, so as to judge that the second memory 100 does not store data to be processed. This operation is performed in each cycle independently of the first arithmetic unit 20 [T000].

Also, the processability judgement part 170 of the second control unit 120 receives the processability judgement signal 150 from the third arithmetic unit 130 in each cycle, so as to judge that the third arithmetic unit 130 does not include data to be written. This operation is also performed in each cycle independently of the first arithmetic unit 20 [U000].

The first arithmetic unit 20 receives the execution program 4 from the first memory 10, receives data of 100 words of the arrays a, b and c from the first memory 10, and successively writes the received data in the second memory 100.

(Cycle #0)

The first arithmetic unit 20 receives the execution program 4 from the first memory 10, and sets the write pointer 62 at "100" and the pointer 60 at "0" in the first control unit 50 [S002].

(Cycle #1)

The processability judgement part 70 of the first control unit 50 compares the values of the write pointer 62 and the pointer 60, and judges that the data can be read because the pointer 60 is set at "0" and the write pointer 62 is set at "100" [T000].

Accordingly, the processability judgement part 70 outputs the processability judgement signal 72 to the second memory 100 and the second arithmetic unit 30, and the second memory 100 outputs first data a[0], b[0] and c[0] of the data arrays a, b and c in response to this signal. Also, the pointer 60 is incremented by 1 correspondingly to one element of the array [T001].

The operations of the first control unit 50 and the second memory 100 in this cycle #1 are continuously similarly conducted in each cycle thereafter until the value of the pointer 60 becomes "100", namely, the same value as the write pointer 62.

(Cycle #2)

The first control unit 50 and the second memory 100 conduct the same operations as in the cycle #1, subsequent data of the arrays a, b and c are read, and the pointer 60 is further incremented by 1 correspondingly to one address [T000] [T001].

The data latch 40 of the second arithmetic unit 30 receives the three data a[0], b[0] and c[0] from the second memory 100 and outputs the data to the multiplication part 38. The multiplication part 38 selects a[0] and b[0] among the data, and executes a multiplication, a[0]×b[0]. Furthermore, the processability judgement signal latch 140 receives the processability judgement signal 72 from the first control unit 50 and outputs the signal to the third arithmetic unit 130. Also, the output selector 42 outputs resultant data (a[0]×b[0]) from the multiplication part 38 and the data c[0] from the data latch 40 to the third arithmetic unit 130. The operation of the second arithmetic unit 30 in this cycle is also similarly conducted in each cycle thereafter.

(Cycle #3)

The first control unit 50 and the second memory 100 conduct the same operations as in the cycle #2, subsequent data of the arrays a, b and c are read, and the pointer 60 is further incremented by 1 correspondingly to one address [T000] [T001].

The second arithmetic unit 30 conducts the same operation as in the cycle #2, so as to execute calculation of the subsequent elements, namely, a[1]×b[1].

The data latch 146 of the third arithmetic unit 130 receives the resultant data (a[0]×b[0]) and the data c[0] from the second arithmetic unit 30 and outputs these two data to the addition part 136. The addition part 136 receives these data (a[0]×b[0]) and c[0], and conducts an addition, (a[0]×b[0])+ c[0]. Furthermore, the processability judgement signal latch 142 receives the processability judgement signal 144 from the second arithmetic unit 30 and outputs the signal to the second control unit 120. Also, the output selector 148 outputs resultant data from the addition part 136, namely, (a[0]×b[0])+c[0], to the third memory 102. The operation of the third arithmetic unit 130 in this cycle is also similarly conducted in each cycle thereafter.

(Cycle #4)

The first control unit 50 and the second memory 100 conduct the same operations as in the cycle #3, subsequent data of the arrays a, b and c are read, and the pointer 60 is further incremented by 1 correspondingly to one address [T000] [T001].

The second arithmetic unit 30 conducts the same operation as in the cycle #3, so as to execute calculation of the subsequent elements, a[2]×b[2].

The third arithmetic unit 130 conducts the same operation as in the cycle #3, so as to execute calculation of the subsequent elements, a[1]×b[1]+c[1].

The processability judgement part 170 of the second control unit 120 receives the processability judgement signal 150 from the third arithmetic unit 130 and judges that the data can be written [U000].

Furthermore, the third memory 102 receives the processability judgement signal 166 from the processability judgement part 170 of the second control unit 120, and writes the resultant data from the third arithmetic unit 130 in an address pointed by the write pointer 162 as a resultant data d[0]. Simultaneously, the value of the write pointer 162 of the second control unit 120 is incremented by +1 [U001].

Specifically, the data and the processability judgement signal received by the second arithmetic unit 30 are the data 32 output from the second memory 100 in the previous cycle and the processability judgement signal 72 output from the first control unit 50 in the previous cycle. Also, the data and the processability judgement signal received by the third arithmetic unit 130 are the data 34 and the processability judgement signal 144 output from the second arithmetic unit 30 in the previous cycle (namely, the data output from the second memory 100 and the processability judgement signal output from the first control unit 50 in the cycle before the previous cycle). Furthermore, the data and the processability judgement signal received by the third memory 102 and the second control unit 120 are the data and the processability judgement signal output from the third arithmetic unit 130.

(Cycle #5)

The first control unit 50 and the second memory 100 conduct the same operations as in the cycle #3, subsequent data in the arrays a, b and c are read, and the pointer 60 is further incremented by 1 correspondingly to one address [T000] [T001].

The second arithmetic unit 30 conducts the same operation as in the cycle #4, so as to execute calculation of the subsequent elements, a[3]×b[3]. The third arithmetic unit 130 conducts the same operation as in the cycle #4, so as to execute calculation of the subsequent elements, a[2]×b[2]+ c[2].

The second control unit 120 and the third memory 102 conduct the same operations as in the cycle #4, so that a subsequent resultant data d[1] can be stored and the write pointer 162 can be incremented by 1.

In each cycle thereafter, the same operations are similarly repeated. The first control unit 50 and the second memory 100 repeat the similar operations until the pointer 60 and the write pointer 62 are set at the same value, "100". Also, in the second control unit 120, the processability judgement signal 72 generated by the first control unit 50 is counted up from the cycle #4 to a cycle 103, so as to store resultant data of "100" cycles, namely, data d[0] through d[99], and the execution of the program is completed.

Also, the first arithmetic unit 20 periodically refers the write pointer 162 of the second control unit 120 at timing predetermined in the execution program, so as to judge whether or not the write pointer 162 is set at "100". Thus, it is determined whether or not the execution of the program is completed [S003] [S004].

Specifically, with regard to the data stored in the second memory 100, the processability judgement signal corresponding to the processability of the processing of the data is output from the processability judgement part 70 of the first control unit 50 and is added to the data every time the data is output in each cycle. The data and the processability judgement signal are thus output as a pair to the second and third arithmetic units 30 and 130, and each of these arithmetic units outputs the resultant data obtained through its processing and the received processability judgement signal as a pair. Also, after the data have passed through the arithmetic units in the plural stages, when the resultant data is written in the memory, the processability judgement signal transferred as a pair with the resultant data is referred, so as to judge the presence of effective data by the memory. Therefore, regardless of the number of stages of the arithmetic units, the resultant data obtained through the processing can be written without fail.

The aforementioned principle is utilized to be expanded to a case where plural memories, corresponding plural control units and plural arithmetic units in plural stages are connected with a network having plural paths, and the connection state in the network is re-constructed in accordance with a network form line from a first arithmetic unit.

Figure 5:
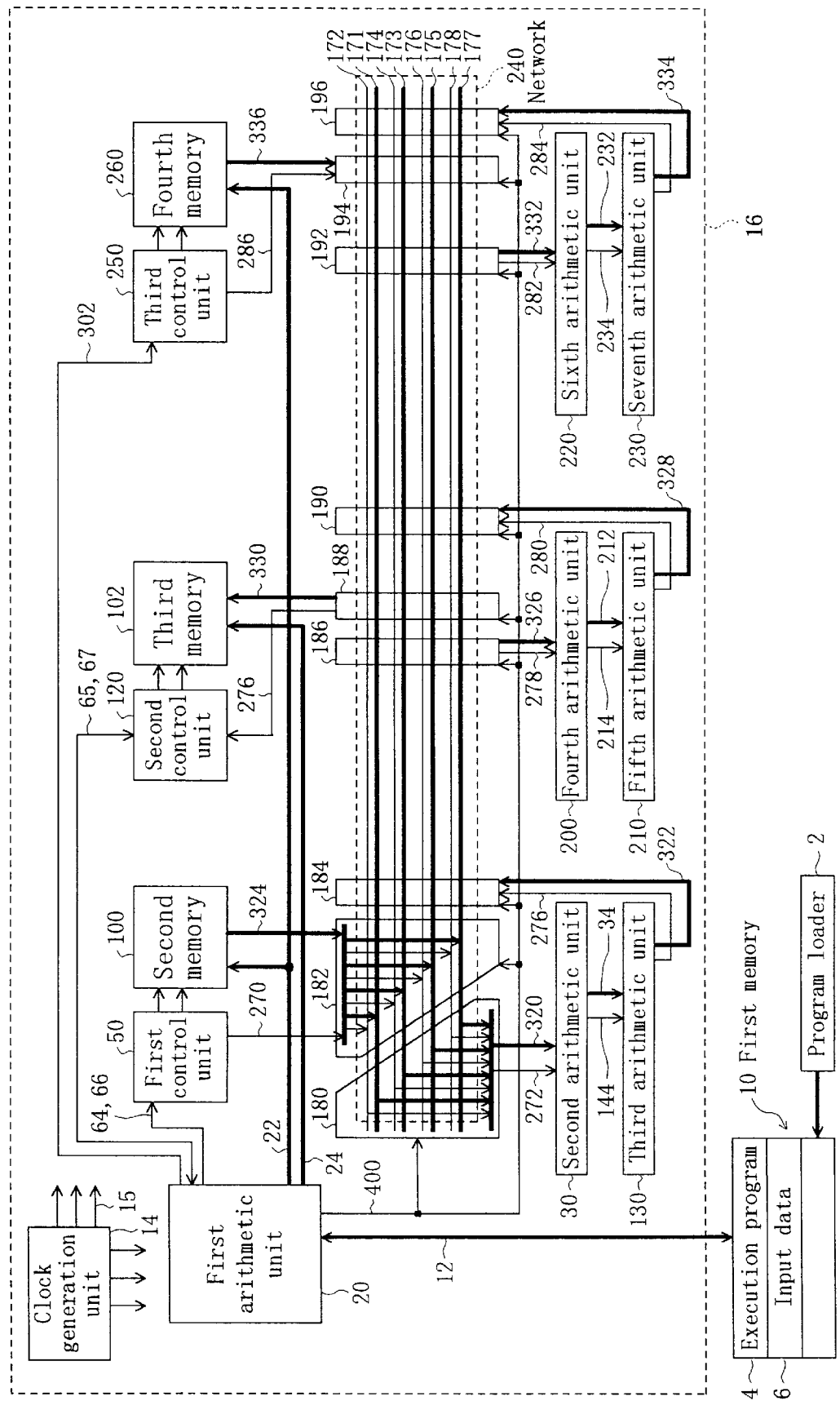
FIG. 5 is a diagram for showing the configuration of a data processor of the first embodiment.

FIG. 5 is a diagram for showing a data processor according to the first embodiment of the invention. Differences of the first embodiment from the aforementioned principle of the invention are as follows:

A reference numeral 270 denotes a processability judgement signal output from the first control unit 50, a reference numeral 324 denotes a data line from the second memory 100. A reference numeral 260 denotes a fourth memory (data storage unit), and a reference numeral 250 denotes a third control unit (control unit) for controlling the fourth memory 260. These members have the same functions as the second memory 100 and the first control unit 50, respectively.

A reference numeral 240 denotes a network including four pairs of processability judgement signals (buses) 172, 174, 176 and 178 and data lines (buses) 171, 173, 175 and 177.

Reference numerals 182, 184, 190, 194 and 196 denote output bus switches for outputting the processability judgement signals and the data to the network 240. Each of these output bus switches can programmably output the processability judgement signal and the data to any buses of the network 240, and the selecting method is programmed in the execution program 4.

Reference numerals 180, 186, 188 and 192 denote input bus switches for programmably inputting the processability judgement signals and the data from any buses of the network 240 to the respective arithmetic units, and the selecting method is programmed in the execution program 4 similarly to that of the output bus switches.

A reference numeral 400 denotes a data processor form line for controlling the input bus switches and the output bus switches.

The data processor of this embodiment is thus different from the principle.

Figure 6:
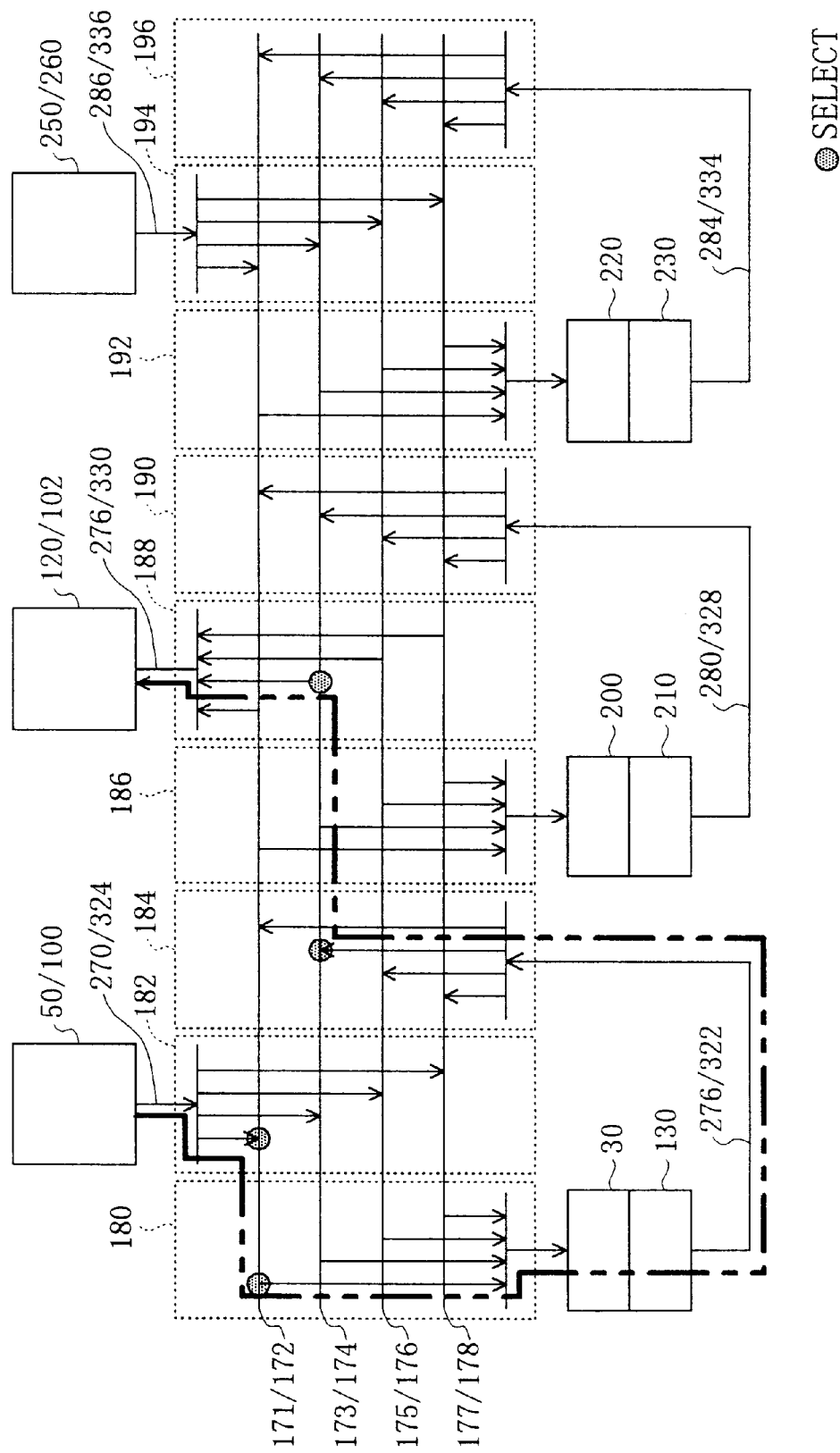
FIG. 6 is a diagram for showing an example of data flow in the data processor of the first embodiment.
Figure 7:
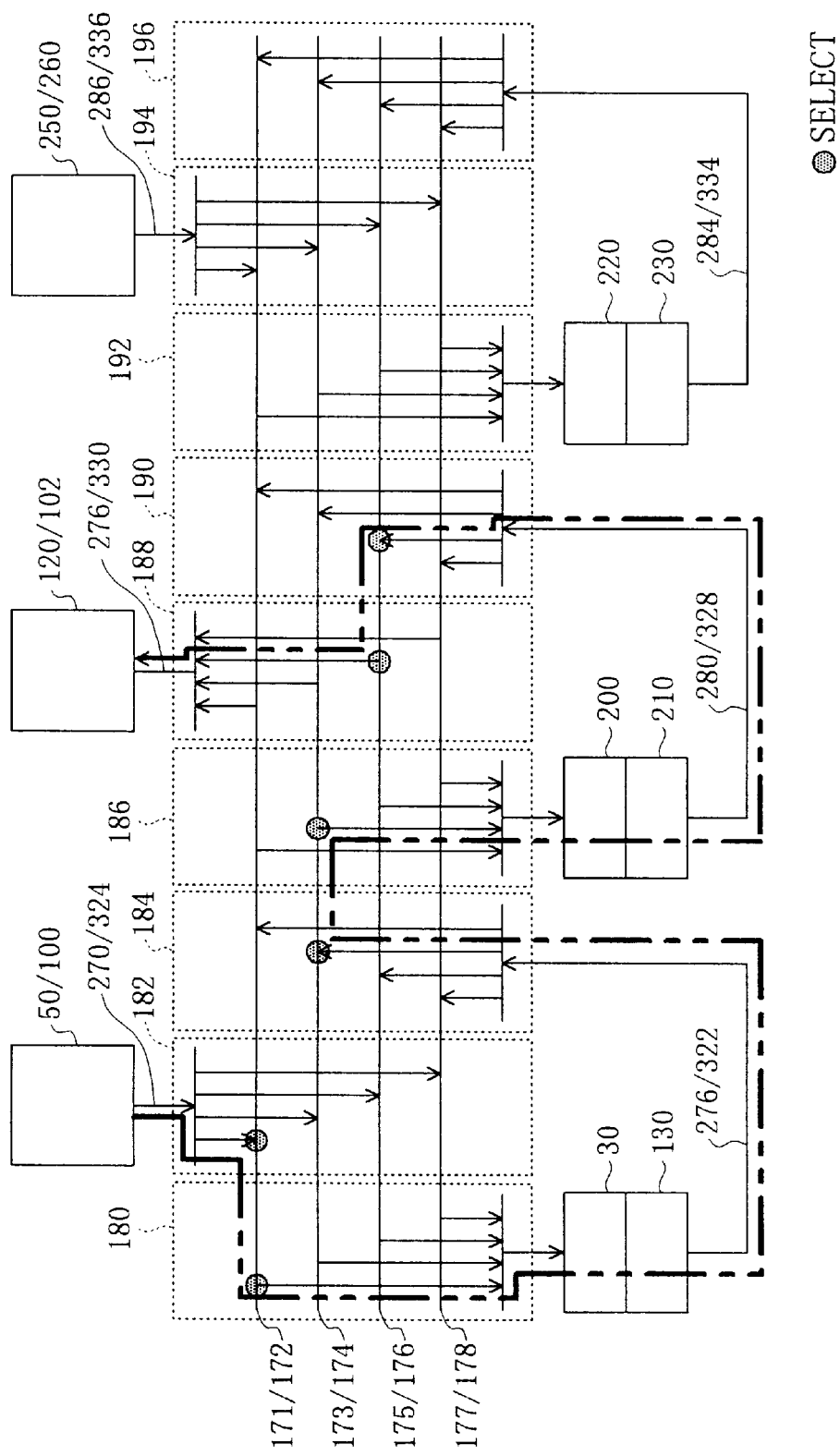
FIG. 7 is a diagram for showing another example of the data flow in the data processor of the first embodiment.

FIGS. 6 and 7 are diagrams for showing data flow in the network formed by the network form line in this embodiment.

In the data processor of FIG. 5, in order to execute the [Program 1], the output bus switch 182 is switched so that signals on the pair of the processability judgement signal 270 of the first control unit 50 and the data line 324 of the second memory 100 can be output to the processability judgement signal 172 and the data line 171 of the network 240. Also, the input bus switch 180 is switched so that signals on the processability judgement signal 172 and the data line 171 can be input to the second arithmetic unit 30. Furthermore, the output bus switch 184 is switched so that signals on the processability judgement signal 276 and the data line 322 of the third arithmetic unit 130 can be output to the processability judgement signal 174 and the data line 173 of the network 240. Moreover, the input bus switch 188 is switched so that signals on the processability judgement signal 276 and the data line 330 to the second control unit 120 and the third memory 102 can be input from the processability judgement signal 174 and the data line 173 of the network 240. In this manner, the aforementioned operation can be performed. The timing is the same as that described in the principle, and the description of the timing is omitted.

At this point, the data processor is assumed to further include a fourth arithmetic unit 200 having the same multiplication function as the second arithmetic unit 30 and a fifth arithmetic unit 210 having the same addition function as the third arithmetic unit 130.

Under these circumstances, the following program is assumed to be executed:
[Program 2]

```
#define DSIZE=100;
main(){
  int iii;
  int a[DSIZE],b[DSIZE],c[DSIZE],d[DSIZE];
    for(iii=0; iii<DSIZE; iii++){
      d[iii]=a[iii]*a[iii]+b[iii]*b[iii]+c[iii];
    }
}
```

Differently from the above-described [Program 1], multiplication and addition are respectively executed twice in the [Program 2]. Specifically, in the data processor 16, data input from the network 240 are subjected to the multiplication/addition by the second arithmetic unit 30 and the third arithmetic unit 130, and then, the resultant data are input again through the network 240 to other arithmetic units (specifically, the fourth arithmetic unit 200 and the fifth arithmetic unit 210) for further multiplication/addition.

The aforementioned program can be executed by setting the switching connections in the network 240 as follows: The following is a content generated by a compiler or the like in compiling the program, and is stored in, for example, the execution program 4 as setting data:

As is shown in FIG. 7, the output bus switch 182 is switched so that signals on the pair of the processability judgement signal 270 of the first control unit 50 and the data line 324 of the second memory 100 can be output to the processability judgement signal 172 and the data line 171 of the network 240, and the input bus switch 180 is switched so that signals on the processability judgement signal 172 and the data line 171 can be input to the second arithmetic unit 30. Furthermore, the output bus switch 184 is switched so that signals on the processability judgement signal 276 and the data line 322 from the third arithmetic unit 130 can be output to the processability judgement signal 174 and the data line 173 of the network 240. Moreover, the input bus switch 186 is switched so that signals on the processability judgement signal 174 and the data line 173 can be input to the fourth arithmetic unit 200. Also, the output bus switch 190 is switched so that signals on the processability judgement signal 280 and the data line 328 from the fifth arithmetic unit 210 can be output to the processability judgement signal 176 and the data line 175 of the network 240. In addition, the input bus switch 188 is switched so that signals on the processability judgement signal 276 and the data line 330 to the second control unit 120 can be input from the processability judgement signal 176 and the data line 175 of the network 240. In this manner, the above-described operation can be conducted.

Figure 8:
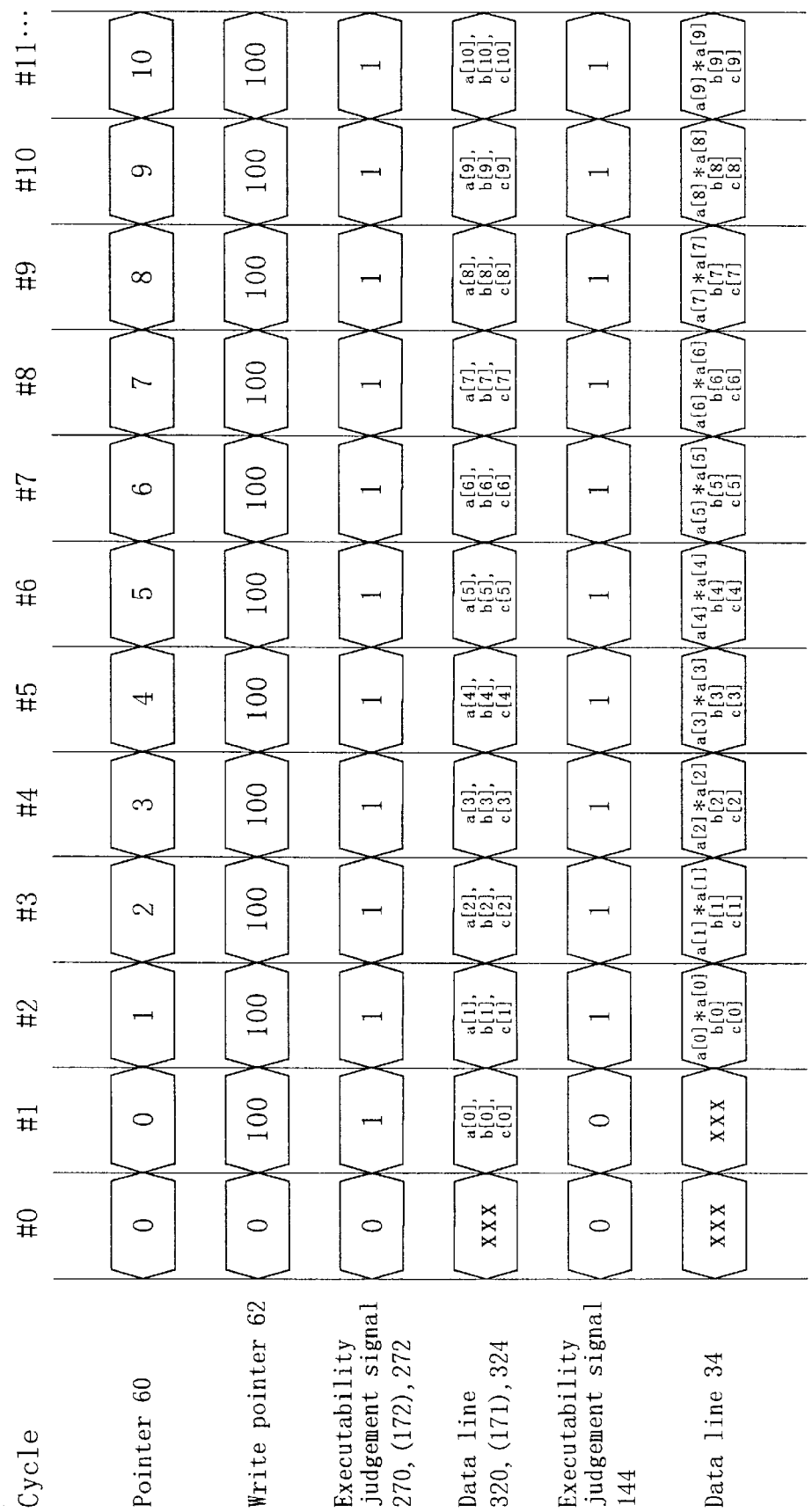
FIG. 8 is an explanatory diagram for showing data values at respective members of the data processor of the first embodiment in the data flow of FIG. 7.
Figure 9:
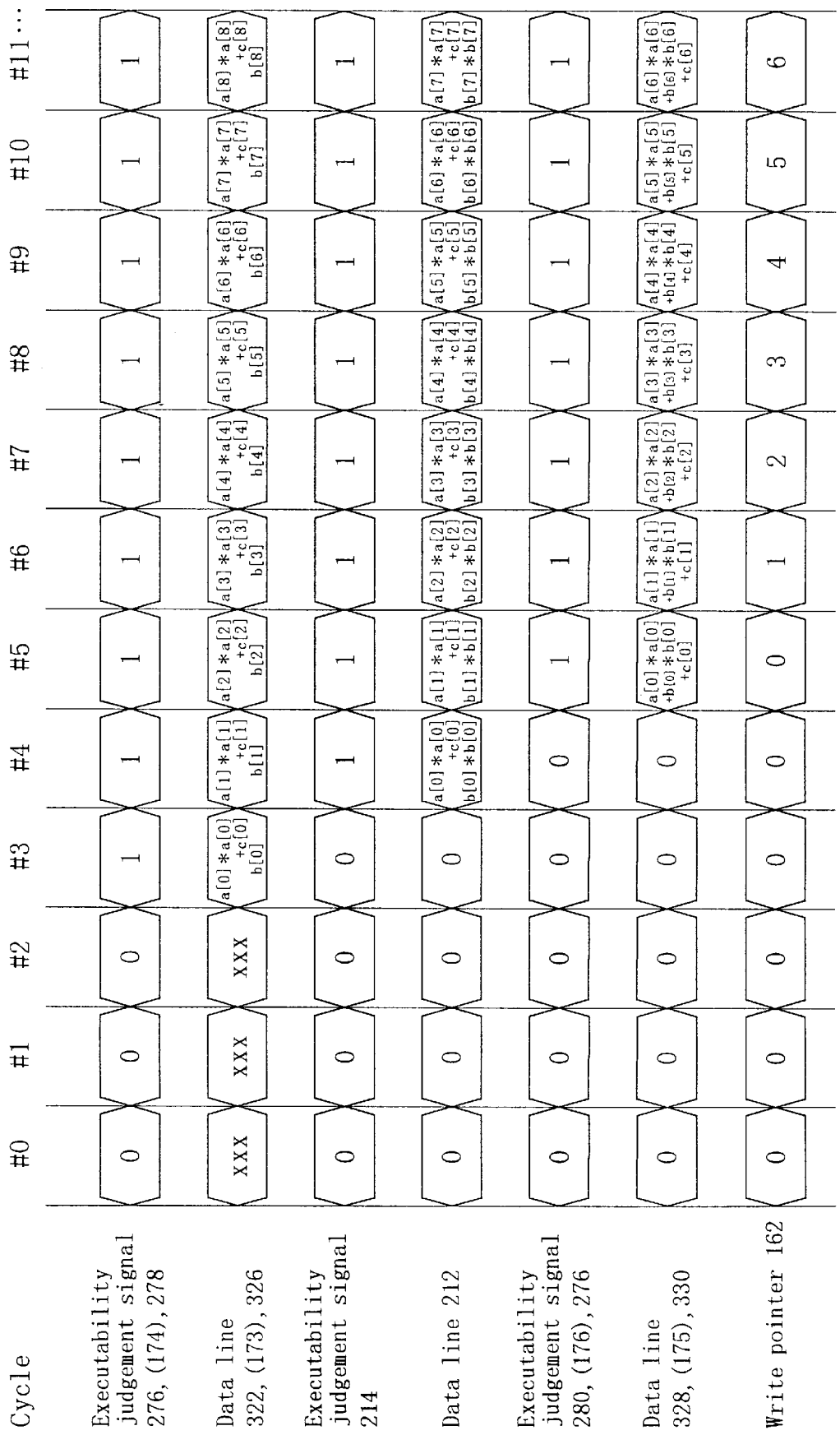
FIG. 9 is an explanatory diagram for showing data values at other members of the data processor of the first embodiment in the data flow of FIG. 7.

FIGS. 8 and 9 are diagrams for showing data values at the respective members in executing the [Program 2] in the first embodiment.

Now, the first embodiment will be described with reference to FIGS. 2, 3($a$), 3($b$), 5, 6, 7, 8 and 9.
(Prior to cycle #0)

The execution program 4 and the input data 6 used in the data processor of this embodiment are previously generated by a compiler or an assembler to be stored in the first memory 10 by the program loader 2 [S000].

Specifically, data of the input data arrays a, b and c are stored in the first memory 10 as the input data 6, and the execution program 4 includes a flow for the operation of this embodiment as described below.

At this point, an external processor or the like can be used as the program loader, which is not described in detail because it is not the main part of the invention.

The first arithmetic unit 20 receives the execution program 4 from the first memory 10, and initializes the pointer 60 and the write pointer 62 of the first control unit 50 to "0".

The first arithmetic unit 20 receives the execution program 4 from the first memory 10, and initializes the pointer 160 and the write pointer 162 of the second control unit 120 to "0".

The first arithmetic unit 20 receives the execution program 4 from the first memory 10, and sets the connections of the input bus switches and the output bus switches in accordance with the network form line 400 [S001].

Also, the processability judgement part 70 of the first control unit 50 refers and compares the values of the pointer 60 and the write pointer 62 in each cycle, so as to judge that the second memory 100 does not store data to be processed [T000].

Furthermore, the processability judgement part 170 of the second control unit 120 receives the processability judgement signal 150 from the third arithmetic unit 130 in each cycle, so as to judge there is no data to be written [U000].

The first arithmetic unit 20 receives not only the execution program 4 from the first memory 10 but also data of "100" words of the arrays a, b and c from the first memory 10, and successively writes the received data in the second memory 100.
(Cycle #0)

The first arithmetic unit 20 receives the execution program 4 from the first memory 10, and sets the write pointer 62 of the first control unit 50 at "100" and the pointer 60 at "0" [S002].

(Cycle #1)

The processability judgement part 70 of the first control unit 50 compares the values of the write pointer 62 and the pointer 60, and determines that data can be read because the pointer 60 is set at "0" and the write pointer 62 is set at "100" [T000].

Accordingly, the processability judgement part 70 outputs the processability judgement signal to the second memory 100 and also to the second arithmetic unit 30 through the processability judgement signal 172 of the network 240.

The second memory 100 outputs first data a[0], b[0] and c[0] of the data arrays a, b and c to the data line 171 of the network 240 in response to the processability judgement signal 172. Also, the pointer 60 is incremented by 1 correspondingly to one element of the array [T001].

The operations of the first control unit 50 and the second memory 100 in this cycle #1 are continuously similarly conducted in each cycle thereafter until the value of the pointer 60 becomes "100", namely, the same as the value of the write pointer 62.

(Cycle #2)

The first control unit 50 and the second memory 100 conduct the same operations as in the cycle #1, subsequent data of the arrays a, b and c are read, and the pointer 60 is further incremented by 1 correspondingly to one address [T000] [T001].

The data latch 40 of the second arithmetic unit 30 receives the three data, a[0], b[0] and c[0], from the second memory 100, and outputs the received data to the multiplication part 38. The multiplication part 38 selects a[0] among the data and conducts a multiplication, a[0]×a[0]. Furthermore, the processability judgement signal latch 140 receives the processability judgement signal 172 from the first control unit 50 and outputs the signal to the third arithmetic unit 130. Also, the output selector 42 outputs resultant data (a[0]×a[0]) from the multiplication part 38 and the data b[0] and c[0] from the data latch 40 to the third arithmetic unit 130. The operation of the second arithmetic unit 30 in this cycle is also similarly conducted in each cycle thereafter.

(Cycle #3)

The first control unit 50 and the second memory 100 conduct the same operations as in the cycle #2, subsequent data of the arrays a, b and c are read, and the pointer 60 is further incremented by 1 correspondingly to one address [T000] [T001].

The second arithmetic unit 30 conducts the same operation as in the cycle #2, and executes calculation of the subsequent element, a[1]×a[1].

The data latch 146 of the third arithmetic unit 130 receives the three data, (a[0]×a[0]), b[0] and c[0] from the second arithmetic unit 30, and outputs the data to the addition part 136. The addition part 136 selects (a[0]×a[0]) and c[0], and conducts an addition, (a[0]×a[0])+c[0]. Furthermore, the processability judgement signal latch 142 receives the processability judgement signal 144 from the second arithmetic unit 30 and outputs the signal to the processability judgement signal 174 of the network 240. Also, the output selector 148 outputs resultant data, (a[0]×a[0])+c[0], from the addition part 136 and the data b[0] to the data line 173 of the network 240. The operation of the third arithmetic unit 130 in this cycle is also similarly conducted in each cycle thereafter.

(Cycle #4)

The first control unit 50 and the second memory 100 conduct the same operations as in the cycle #3, subsequent data of the arrays a, b and c are read, and the pointer 60 is further incremented by 1 correspondingly to one address [T000] [T001].

The second arithmetic unit 30 conducts the same operation as in the cycle #3, and executes calculation of the subsequent element, a[2]×a[2].

The third arithmetic unit 130 conducts the same operation as in the cycle #3, and executes calculation of the subsequent elements, a[1]×a[1]+c[1].

The data latch of the fourth arithmetic unit 200 receives the two data, a[0]×a[0]+c[0] and b[0], from the data line 173 of the network 240, and outputs the received data to the multiplication part. The multiplication part selects b[0] among the data, and conducts a multiplication, b[0]×b[0]. Furthermore, the processability judgement signal latch of the fourth arithmetic unit 200 receives the processability judgement signal 174 of the network 240 and outputs the signal to the fifth arithmetic unit 210. The output selector of the fourth arithmetic unit 200 outputs resultant data (b[0]× b[0]) from the multiplication part and a[0]×a[0]+c[0] from the data latch to the fifth arithmetic unit 210. The operation of the fourth arithmetic unit 200 in this cycle is also similarly conducted in each cycle thereafter.

(Cycle #5)

The first control unit 50 and the second memory 100 conduct the same operations as in the cycle #4, subsequent data of the arrays a, b and c are read, and the pointer 60 is further incremented by 1 correspondingly to one address [T000] [T001].

The second arithmetic unit 30 conducts the same operation as in the cycle #4, and executes calculation of the subsequent element, a[3]×a[3].

The third arithmetic unit 130 conducts the same operation as in the cycle #4, and executes calculation of the subsequent elements, a[2]×a[2]+c[2].

The fourth arithmetic unit 200 conducts the same operation as in the cycle #4, and executes calculation of the subsequent element, b[1]×b[1].

The fifth arithmetic unit 210 receives the two data, (a[0]×a[0]+c[0]) and b[0]×b[0], from the fourth arithmetic unit 200, and outputs the data to the addition part. The addition part receives the two data, (a[0]×a[0]+c[0]) and b[0]×b[0], and conducts an addition, (a[0]×a[0]+c[0])+b[0]× b[0]. Furthermore, the processability judgement signal latch receives the processability judgement signal 214 from the fourth arithmetic unit 200, and outputs the signal to the processability judgement signal 280/176 of the network 240. The output selector outputs resultant data, a[0]×a[0]+b[0]× b[0]+c[0], from the addition part to the data line 175 of the network 240. The operation of the fifth arithmetic unit 210 in this cycle is also similarly conducted in each cycle thereafter.

(Cycle #6)

The first control unit 50 and the second memory 100 conduct the same operations as in the cycle #5, subsequent data of the arrays a, b and c are read, and the pointer 60 is further incremented by 1 correspondingly to one address [T000] [T001].

The second arithmetic unit 30 conducts the same operation as in the cycle #5, and executes calculation of the subsequent element, a[4]×a[4].

The third arithmetic unit 130 conducts the same operation as in the cycle #5, and executes calculation of the subsequent elements, a[3]×a[3]+c[3].

The fourth arithmetic unit 200 conducts the same operation as in the cycle #5, and executes calculation of the subsequent element, b[2]×b[2].

The fifth arithmetic unit 210 conducts the same operation as in the cycle #5, and executes calculation of the subsequent elements, a[1]×a[1]+b[1]×b[1]+c[1].

The processability judgement part 170 of the second control unit 120 receives the processability judgement signal of the fifth arithmetic unit 210 through the processability judgement signal 176 of the network 240, so as to determine that data can be written [U000].

Furthermore, the third memory 102 receives the processability judgement signal 166 from the processability judgement part 170, receives the resultant data from the fifth arithmetic unit 210 through the data line 175 of the network 240, and writes the data in an address pointed by the write pointer 162 as a resultant data d[0]. Simultaneously, the write pointer 162 of the second control unit 120 is incremented by +1 [U001].

(Cycle #7)

The first control unit 50 and the second memory 100 conduct the same operations as in the cycle #6, subsequent data of the arrays a, b and c are read, and the pointer 60 is further incremented by 1 correspondingly to one address [T000] [T001].

The second arithmetic unit 30 conducts the same operation as in the cycle #6, and executes calculation of the subsequent element, a[5]×a[5].

The third arithmetic unit 130 conducts the same operation as in the cycle #6, and executes calculation of the subsequent elements, a[4]×a[4]+c[4].

The fourth arithmetic unit 200 conducts the same operation as in the cycle #6, and executes calculation of the subsequent element, b[3]×b[3].

The fifth arithmetic unit 210 conducts the same operation as in the cycle #6, and executes calculation of the subsequent elements, a[2]×a[2]+b[2]×b[2]+c[2].

The third memory 102 conducts the same operation as in the cycle #6, and stores a subsequent resultant data d[1]. The write pointer 162 is incremented by one.

In each cycle thereafter, the similar operations are repeated. The first control unit 50 and the second memory 100 repeat the similar operations until the value of the pointer 60 becomes the same value as the write pointer 62, namely, "100". Also, in the second control unit 120, the processability judgement signal generated in the first control unit 50 is counted up from the cycle #6to a cycle 105, so that resultant data of the 100 cycles, d[0] through d[99], can be stored, and the execution of the program is completed. Furthermore, the first arithmetic unit 20 periodically refers the write pointer 162 of the second control unit 120 at timing predetermined in the execution program, so as to judge whether or not the value becomes "100". Thus, it is determined whether or not the execution of the program is completed [S00] [S004].

At this point, when the processing can be performed by merely the pair of the second arithmetic unit 30 and the third arithmetic unit 130 as in executing the [Program 1], the number of cycles required for the processing is "2". However, when the network 240 is reconstructed so that the processing can be conducted first by the pair of the second arithmetic unit 30 and the third arithmetic unit 130 and then by the pair of the fourth arithmetic unit 200 and the fifth arithmetic unit 210 as in executing the [Program 2], the number of cycles required for the processing is "4".

In other words, since a processability judgement signal corresponding to processability of data (namely, presence of data) is added to data in outputting the data, even when the number of stages of arithmetic units is variable, the transferred data can be similarly written by using the processability judgement signal in writing the data. Furthermore, when the network including plural paths is disposed among the memories and corresponding arithmetic units and the buses are variously switched in the network, more flexible programmability can be realized.

EMBODIMENT 2

Figure 10:
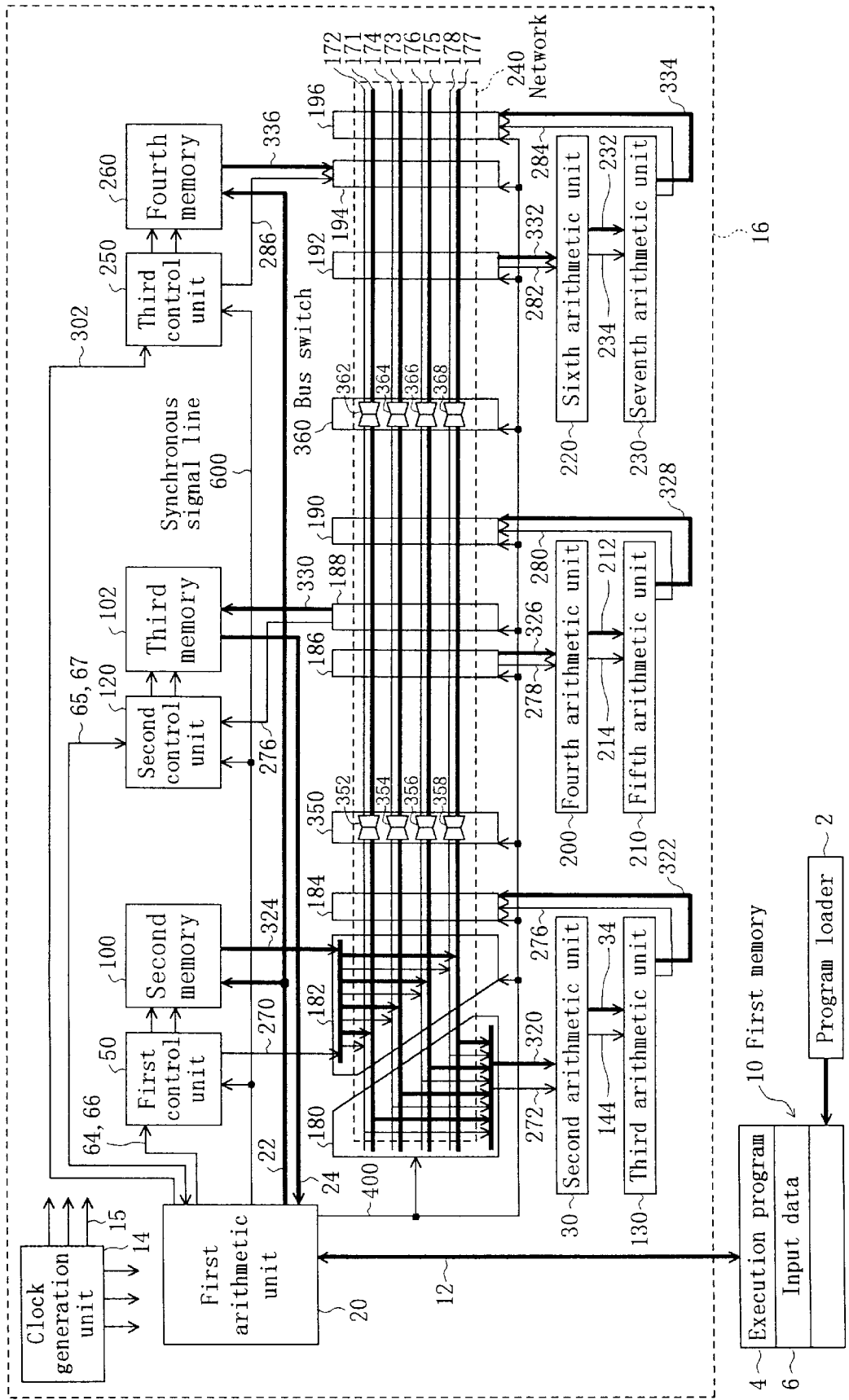
FIG. 10 is a diagram for showing the configuration of a data processor according to a second embodiment.

FIG. 10 is a diagram for showing a data processor according to a second embodiment of the invention.

This data processor is different from that of the first embodiment in the following points: A synchronous signal 600 corresponding to a cycle to start outputting data of arrays a, b, c, d, e and f stored in the memories 100 and 260 is input from the first arithmetic unit 20 to the control units 50, 120 and 250 in this data processor.

Furthermore, the network 240 is provided, for disconnecting respective buses, with bus switches 350 (352, 354, 356 and 358) between the first control unit, the second memory, the second arithmetic unit and the third arithmetic unit, and the second control unit, the third memory, the fourth arithmetic unit and the fifth arithmetic unit, and with bus switches 360 (362, 364, 366 and 368) between the second control unit, the third memory, the fourth arithmetic unit and the fifth arithmetic unit, and the third control unit, the fourth memory, the sixth arithmetic unit and the seventh arithmetic unit.

Each of the bus switches can become bidirectionally conductive when it is in an on-state, and data can be sent and received independently between the bus switches when they are in an off-state. Accordingly, the programmability can be further improved by switching these bus switches.

In the second embodiment, the following program is assumed to be executed:

[Program 3]

```
#define DSIZE=100;
main (){
  int iii;
  int a[DSIZE],b[DSIZE],c[DSIZE];
  int d[DSIZE],e[DSIZE],f[DSIZE];
  int g[DSIZE];
  int t1,t2;
    for (iii=0; iii<DSIZE; iii++){
      t1=a[iii]*b[iii]+c[iii];
      t2=d[iii]*e[iii]+f[iii];
      g[iii]= t1*t2;
    }
}
```

The [Program 3] is different from the above-described [Program 2] in an increased number of input data arrays to be used for the processing. Specifically, since three data are transferred through one data line as described in the principle, the data are required to be stored in plural memories and sent to respective arithmetic units in executing the aforementioned program.

Therefore, in the ultimate stage of the processing (namely, g[iii]=t1*t2;), it is necessary to synchronize two data input (t1 and t2). Furthermore, since the number of data arrays to be processed is large (i.e., six), the network is accordingly more highly used.

Figure 11:
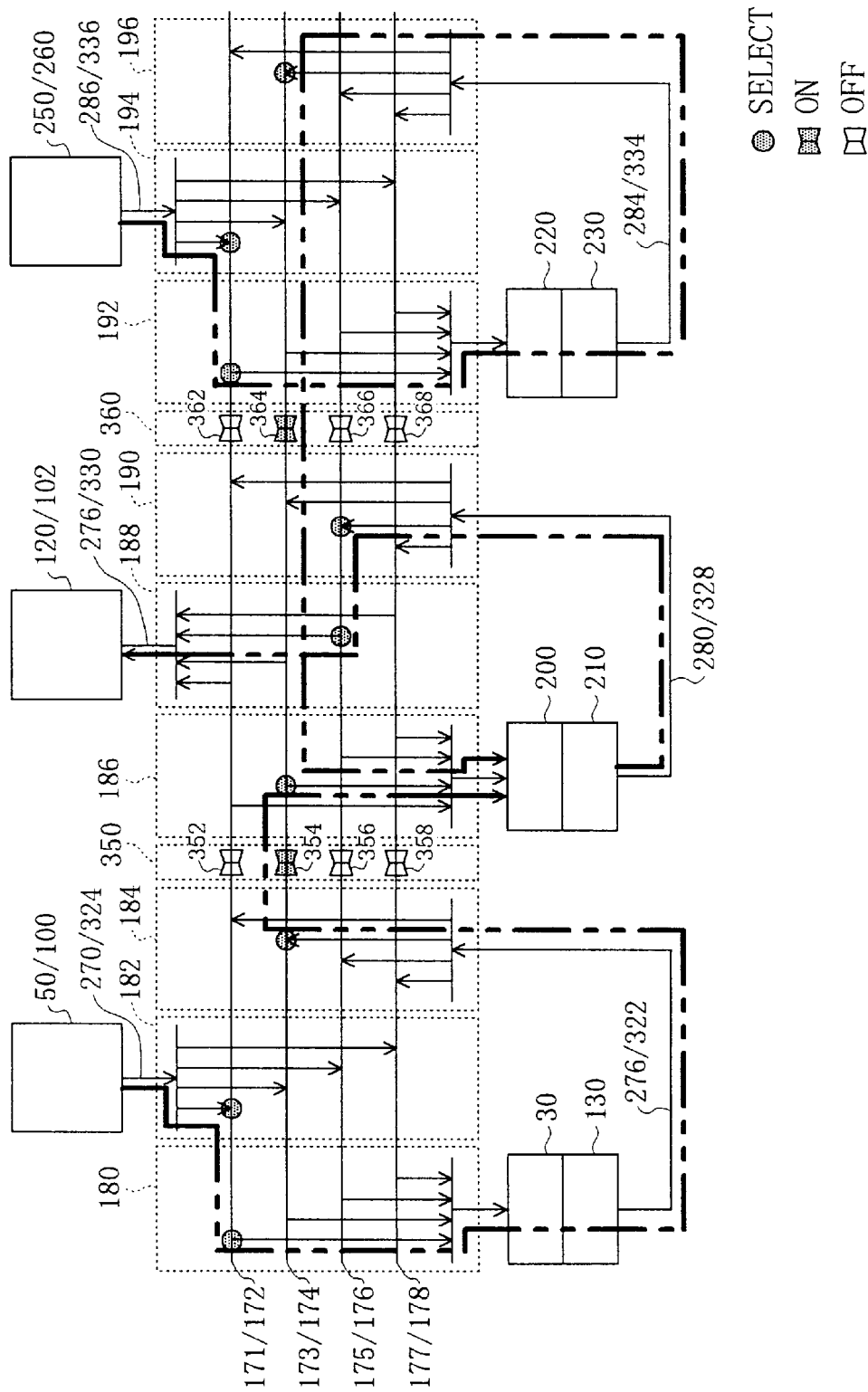
FIG. 11 is a diagram for showing an example of data flow in the data processor of the second embodiment.

The aforementioned program can be executed by setting the switching connections in the network as follows: The following is a content generated by a compiler or the like in compiling the program, and is stored, for example, in the execution program as setting data:

FIG. 11 is a diagram for showing data flow in the network formed by a network form line in this embodiment.

In the data processor of FIG. 10, in order to execute the [Program 3], the output bus switch 182 is switched so that signals on the pair of the processability judgement signal 270 of the first control unit 50 and the data line 324 of the second memory 100 can be output to the processability judgement signal 172 and the data line 171 of the network 240, and the input bus switch 180 is switched so that signals can be input to the second arithmetic unit 30 from the processability judgement signal 172 and the data line 171 as is shown in FIG. 11. Also, the output bus switch 184 is switched so that signals on the processability judgement signal 276 and the data line 322 from the third arithmetic unit 130 can be output to the processability judgement signal 174 and the data line 173 of the network 240.

In the bus switches 350, the bus switch 352 is set in an off-state because the first control unit 50, the second memory 100, the second arithmetic unit 30 and the third arithmetic unit 130 individually need data, and the bus switch 354 is set in an on-state because resultant data of the third arithmetic unit 130 are required to be output to the fourth arithmetic unit 200.

The output bus switch 194 is switched so that signals on the pair of the processability judgement signal 286 of the third control unit 250 and the data line 336 of the fourth memory 260 can be output to the processability judgement signal 172 and the data line 171 of the network 240, the input bus switch 192 is switched so that signals can be input to the sixth arithmetic unit 220 from the processability judgement signal 172 and the data line 171, and the output bus switch 196 is switched so that signals on the processability judgement signal 284 and the data line 334 from the seventh arithmetic unit 230 can be output to the processability judgement signal 174 and the data line 173 of the network 240.

In the bus switches 360, the bus switch 362 is set in an off-state because the third control unit 250, the fourth memory 260, the sixth arithmetic unit 220 and the seventh arithmetic unit 230 individually need data, and the bus switch 364 is set in an on-state because resultant data of the seventh arithmetic unit 230 are required to be output to the fourth arithmetic unit 200.

The input bus switch 186 is switched so that signals on the processability judgement signal 174 and the data line 173 can be input to the fourth arithmetic unit 200, and the output bus switch 190 is switched so that signals on the processability judgement signal 280 and the data line 328 from the fifth arithmetic unit 210 can be output to the processability judgement signal 176 and the data line 175 of the network 240. Furthermore, the input bus switch 188 is switched so that signals on the processability judgement signal 176 and the data line 175 of the network 240 can be input to the processability judgement signal 276 and the data line 330 to the second control unit 120. In this manner, the aforementioned operation can be conducted.

Figure 12:
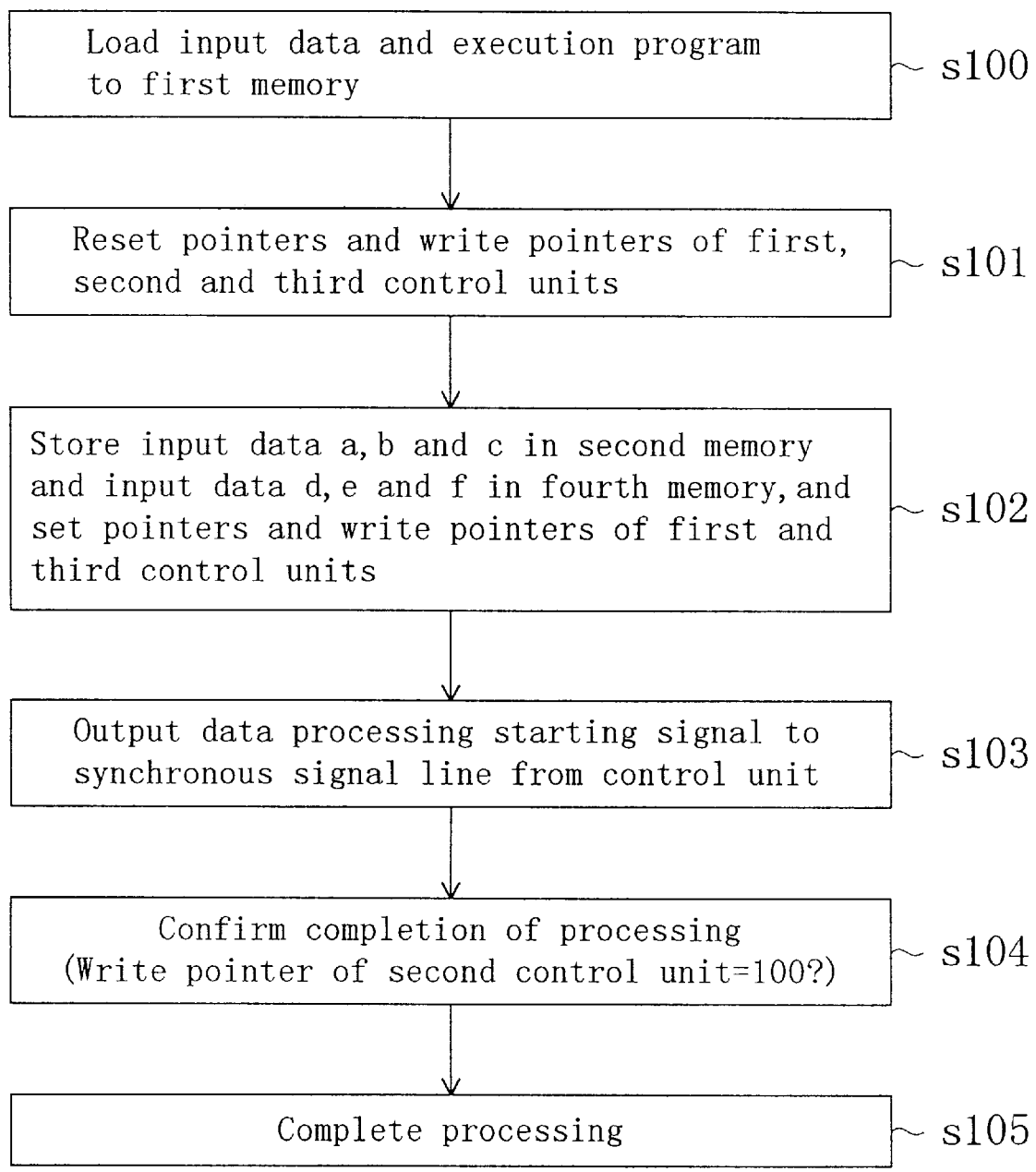
FIG. 12 is a flowchart for showing the operation of a first arithmetic unit in the data processor of the second embodiment.
Figure 13A:
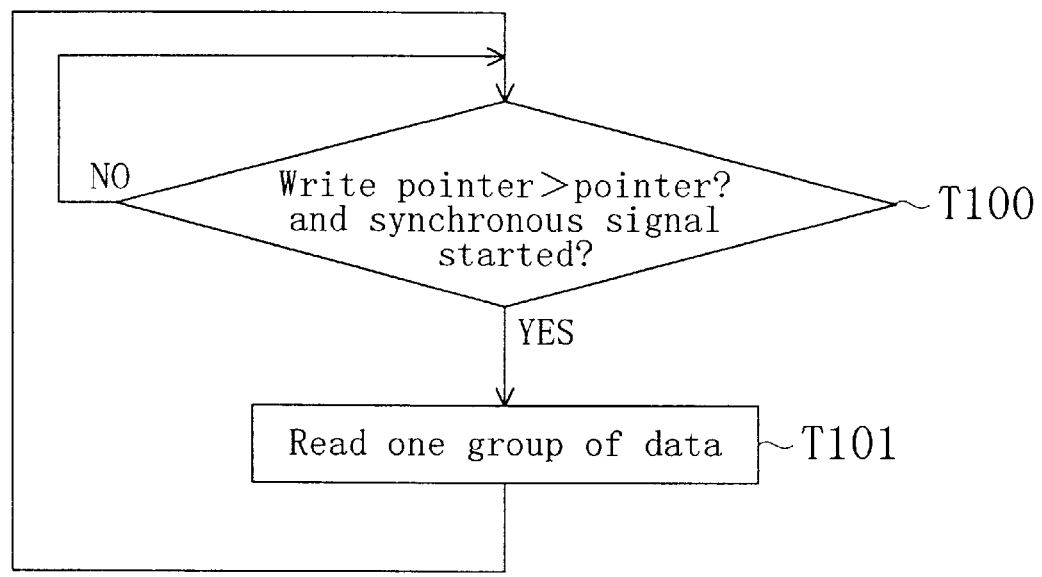
FIG. 13(a) is a flowchart for showing the operation of a first control unit in the data processor of the second embodiment.
Figure 13B:
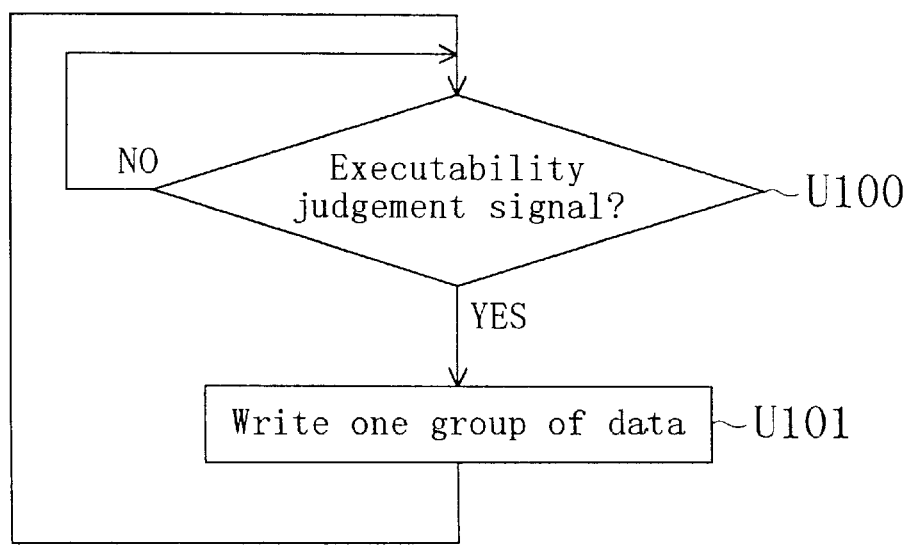
FIG. 13(b) is a flowchart for showing the operation of a second control unit in the data processor of the second embodiment.
Figure 14:
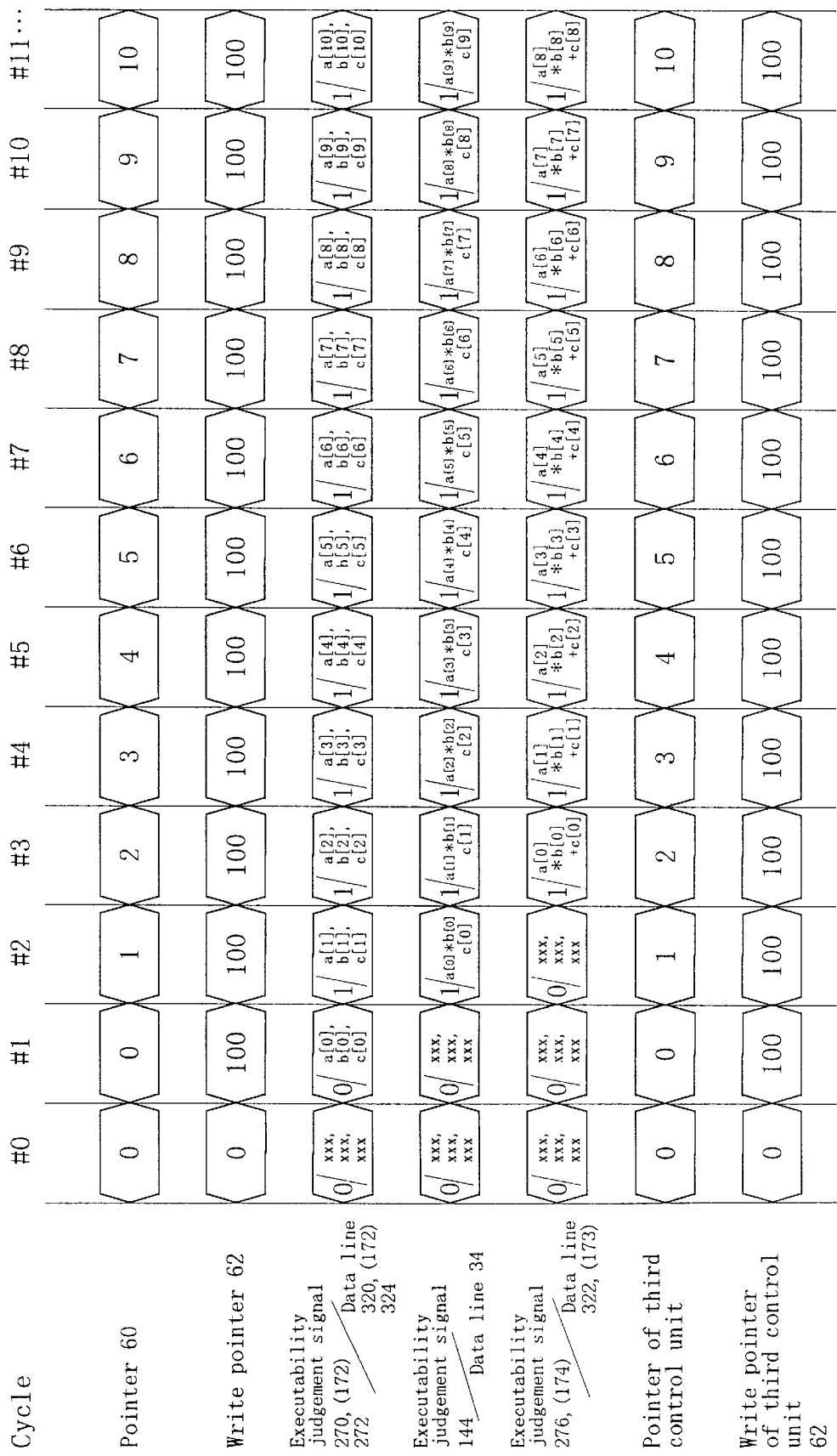
FIG. 14 is an explanatory diagram for showing data values at respective members of the data processor of the second embodiment in the data flow of FIG. 11.
Figure 15:
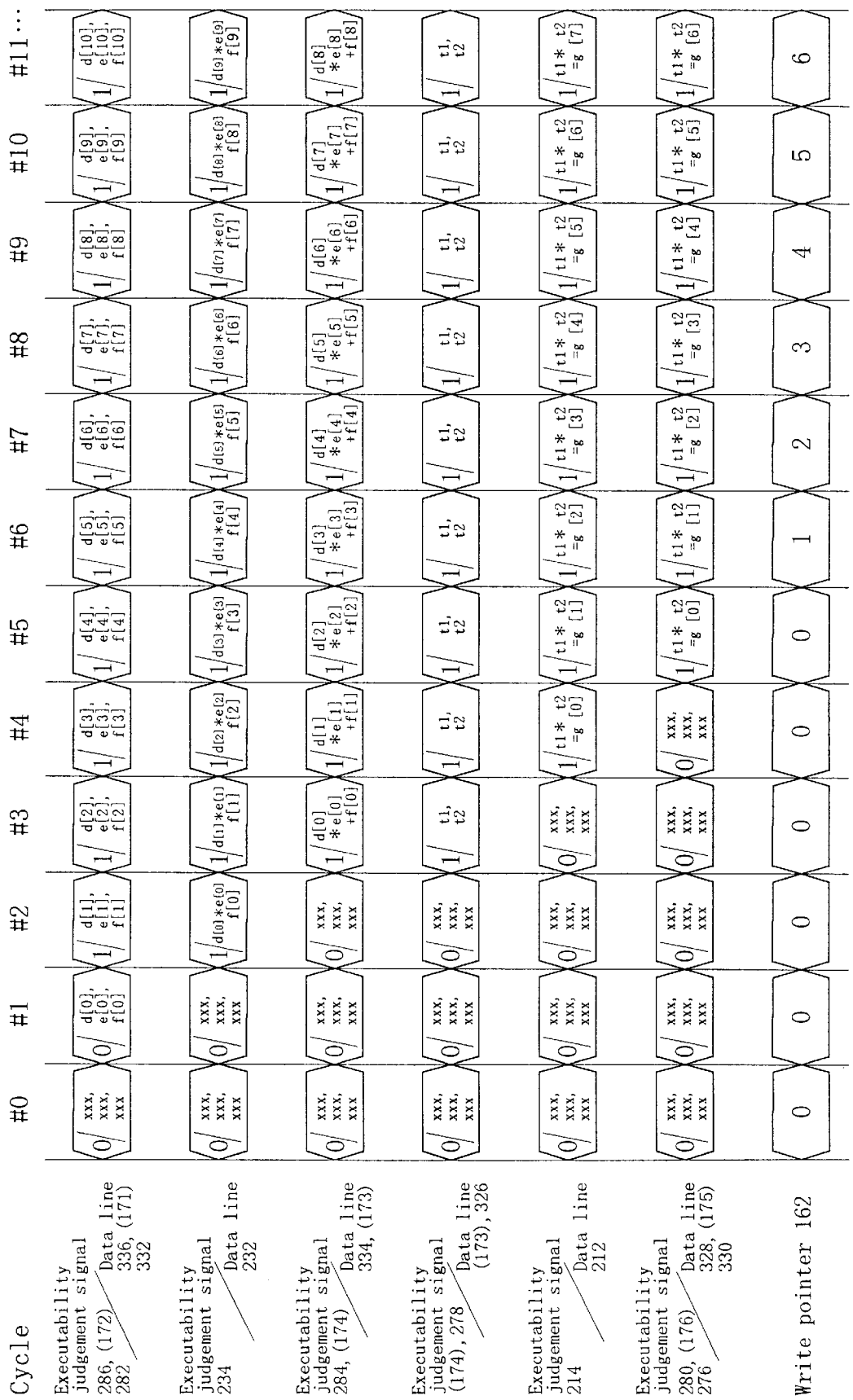
FIG. 15 is an explanatory diagram for showing data values at other members of the data processor of the second embodiment in the data flow of FIG. 11.

FIGS. 12, 13(a) and 13(b) are flowcharts for showing basic operations of the second embodiment, and FIGS. 14 and 15 are diagrams for showing data values at the respective members in executing the [Program 3] in the second embodiment.

Now, the second embodiment of the invention will be described with reference to FIGS. 10, 11, 12, 13(a), 13(b), 14 and 15.

(Prior to cycle #0)

The execution program and the input data used in the data processor of this embodiment are previously generated by a compiler or an assembler to be stored in the first memory 10 by the program loader [S100].

Specifically, the input data arrays a, b, c, d, e and f are stored in the first memory 10 as the input data 6, and the execution program 4 includes a flow for the operation of this embodiment as described below. At this point, an external processor or the like can be used as the program loader, which is not described in detail because it is not the main part of the invention.

The first arithmetic unit 20 receives the execution program from the first memory 10, and initializes the pointer 60 and the write pointer 62 of the first control unit 50 to "0". The first arithmetic unit 20 receives the execution program from the first memory 10, and initializes the pointer 160 and the write pointer 162 of the second control unit 120 to "0". Furthermore, the first arithmetic unit 20 receives the execution program from the first memory 10, and initializes the pointer and the write pointer of the third control unit 250 to "0". The first arithmetic unit 20 receives the execution program from the first memory 10, and sets the connections of the input bus switches, the output bus switches and the bus switches in accordance with the network form line 400 as described above [S101].

The processability judgement parts of the first control unit 50 and the third control unit 250 refer the values of the pointers and the write pointers in each cycle, so as to judge that the second memory 100 and the fourth memory 260 do not store data to be processed and that the processing cannot be started [T100].

Furthermore, the processability judgement part 170 of the second control unit 120 receives the processability judgement signal 150 from the third arithmetic unit 130 in each cycle, so as to judge that there is no data to be written [U100].

The first arithmetic unit 20 receives the execution program from the first memory 10, receives data of 100 words of the arrays a, b and c from the first memory 10, and successively writes the received data in the second memory 100. Furthermore, the first arithmetic unit 20 sets the write pointer 62 of the first control unit 50 at "100" and the pointer 60 at "0" [S102].

Similarly, data of 100 words of the arrays d, e and f are also written in the fourth memory 260, and the write pointer and the pointer of the third control unit 250 are set at "100" and "0", respectively.

(Cycle #0)

The first arithmetic unit 20 receives the execution program from the first memory 10, and outputs a synchronous signal to the synchronous signal line 600 as a processing start signal [S103].

(Cycle #1)

The first control unit 50 compares the values of the write pointer 62 and the pointer 60, further refers the synchronous signal line 600, and judges that the data can be read because the pointer 60 is set at "0", the write pointer 62 is set at "100" and the synchronous signal has been output. Therefore, the processability judgement signal is output to the second memory 100, and also to the second arithmetic unit 30 through the processability judgement signal 172 of the network 240. The second memory 100 outputs, in response to the processability judgement signal, first data a[0], b[0] and c[0] of the data arrays a, b and c to the data line 171 of the network 240. Also, the pointer 60 is incremented by 1 correspondingly to one element of the array [T100] [T101].

The third control unit 250 and the fourth memory 260 conduct similar operations. These operations are continuously similarly conducted in the control units and memories in each cycle until the value of the pointer becomes "100", namely, the same as that of the write pointer.

(Cycle #2)

The first control unit 50 and the second memory 100 conduct the same operations as in the cycle #1, and the pointer 60 is further incremented by 1 correspondingly to one address.

The third control unit 250 and the fourth memory 260 conduct the same operations as in the cycle #1, and the pointer is further incremented by 1 correspondingly to one address.

The second arithmetic unit 30 receives the three data of the second memory 100 through the data line 171 of the network 240, conducts a multiplication, a[0]×b[0], temporarily delays the processability judgement signal 72 from the first control unit 50 by one cycle, and outputs resultant data (a[0]×b[0]), the data c[0] and the delayed processability judgement signal to the third arithmetic unit 130. This operation of the second arithmetic unit 30 is also similarly conducted in each cycle thereafter.

The sixth arithmetic unit 220 receives the three data from the fourth memory 260 through the data line 171 of the network 240, conducts a multiplication, d[0]×e[0], temporarily delays the processability judgement signal 286 from the third control unit 250 by one cycle, and outputs resultant data (d[0]×e[0]), the data f[0] and the delayed processability judgement signal to the seventh arithmetic unit 230. This operation of the sixth arithmetic unit 220 is also similarly conducted in each cycle thereafter.

(Cycle #3)

The first control unit 50 and the second memory 100 conduct the same operations as in the cycle #2, and the pointer 60 is further incremented by 1 correspondingly to one address.

The third control unit 250 and the fourth memory 260 conduct the same operations as in the cycle #2, and the pointer is further incremented by 1 correspondingly to one address.

The second arithmetic unit 30 conducts the same operation as in the cycle #2, and executes calculation of the subsequent elements, a[1]×b[1].

The sixth arithmetic unit 220 conducts the same operation as in the cycle #2, and executes calculation of the subsequent elements, d[1]×e[1].

The third arithmetic unit 130 receives the resultant data from the second arithmetic unit 30, conducts an addition, a[0]×b[0]+c[0], temporarily delays the processability judgement signal from the second arithmetic unit 30 by one cycle, and outputs resultant data a[0]×b[0]+c[0] and the delayed processability judgement signal to the data line 173 and the processability judgement signal 174 of the network 240.

The seventh arithmetic unit 230 receives the resultant data from the sixth arithmetic unit 220, conducts an addition, d[0]×e[0]+f[0], temporarily delays the processability judgement signal from the sixth arithmetic unit 220 by one cycle, and outputs resultant data d[0]×e[0]+f[0] and the delayed processability judgement signal to the data line 173 and the processability judgement signal 174 of the network 240.

(Cycle #4)

The first control unit 50 and the second memory 100 conduct the same operations as in the cycle #3, and the pointer 60 is further incremented by 1 correspondingly to one address.

The third control unit 250 and the fourth memory 260 conduct the same operations as in the cycle #3, and the pointer is further incremented by 1 correspondingly to one address.

The second arithmetic unit 30 conducts the same operation as in the cycle #3, and executes calculation of the subsequent elements, a[2]×b[2].

The sixth arithmetic unit 220 conducts the same operation as in the cycle #3, and executes calculation of the subsequent elements, d[2]×e[2].

The third arithmetic unit 130 conducts the same operation as in the cycle #3, and executes calculation of the subsequent elements, a[1]×b[1]+c[1].

The seventh arithmetic unit 230 conducts the same operation as in the cycle #3, and executes calculation of the subsequent elements, d[1]×e[1]+f[1].

The fourth arithmetic unit 200 simultaneously receives resultant data, t1 (=a[0]×b[0]+c[0]), from the third arithmetic unit 130 through the data line 173 of the network 240, resultant data, t2 (=d[0]×e[0]+f[0]), from the seventh arithmetic unit 230 and the processability judgement signals from the corresponding control units, and conducts a multiplication, t1×t2. Furthermore, the fourth arithmetic unit 200 temporarily delays the processability judgement signal by one cycle, and outputs resultant data obtained by the multiplication and the delayed processability judgement signal to the fifth arithmetic unit 210.

At this point, since the synchronous signal line is generated in the cycle #0, the data are output from the second memory 200 and the fourth memory 260 in the same cycle. Therefore, the resultant data t1 and t2 can be simultaneously input to the fourth arithmetic unit 200 in this cycle.

(Cycle #5)

The first control unit 50 and the second memory 100 conduct the same operations as in the cycle #4, and the pointer 60 is further incremented by 1 correspondingly to one address.

The third control unit 250 and the fourth memory 260 conduct the same operations as in the cycle #4, and the pointer is further incremented by 1 correspondingly to one address.

The second arithmetic unit 30 conducts the same operation as in the cycle #4, and executes calculation of the subsequent elements, a[3]×b[3].

The sixth arithmetic unit 220 conducts the same operation as in the cycle #4, and executes calculation of the subsequent elements, d[3]×e[3].

The third arithmetic unit 130 conducts the same operation as in the cycle #4, and executes calculation of the subsequent elements, a[2]×b[2]+c[2].

The seventh arithmetic unit 230 conducts the same operation as in the cycle #4, and executes calculation of the subsequent elements, d[2]×e[2]+f[2].

The fourth arithmetic unit 200 conducts the same operation as in the cycle #4, and executes subsequent calculation, t1×t2.

The fifth arithmetic unit 210 receives resultant data from the fourth arithmetic unit 200, but there is no need to conduct an addition with regard to this data. Therefore, the fifth arithmetic unit 210 temporarily delays the processability judgement signal from the fourth arithmetic unit 200 by one cycle, and outputs the data received from the fourth arithmetic unit 200 and the delayed processability judgement signal to the data line 175 and the processability judgement signal 176 of the network 240.

(Cycle #6)

The first control unit 50 and the second memory 100 conduct the same operations as in the cycle #5, and the pointer 60 is further incremented by 1 correspondingly to one address.

The third control unit 250 and the fourth memory 260 conduct the same operations as in the cycle #5, and the pointer is further incremented by 1 correspondingly to one address.

The second arithmetic unit 30 conducts the same operation as in the cycle #5, and executes calculation of the subsequent elements, a[4]×b[4].

The sixth arithmetic unit 220 conducts the same operation as in the cycle #5, and executes calculation of the subsequent elements, d[4]×e[4].

The third arithmetic unit 130 conducts the same operation as in the cycle #5, and executes calculation of the subsequent elements, a[3]×b[3]+c[3].

The seventh arithmetic unit 230 conducts the same operation as in the cycle #5, and executes calculation of the subsequent elements, d[3]×e[3]+f[3].

The fourth arithmetic unit 200 conducts the same operation as in the cycle #5, and executes subsequent calculation, t1×t2.

The fifth arithmetic unit 210 conducts the same operation as in the cycle #5, and outputs the data received from the fourth arithmetic unit 200.

The third memory 102 receives the processability judgement signal 176 of the network 240, judges that the data can be written, and writes the resultant data from the data line 175 in an address pointed by the write pointer 162 as a resultant data g[0]. At the same time, the write pointer 162 of the second control unit 120 is incremented by +1.
(Cycle #7)

The first control unit 50 and the second memory 100 conduct the same operations as in the cycle #6, and the pointer 60 is further incremented by 1 correspondingly to one address.

The third control unit 250 and the fourth memory 260 conduct the same operations as in the cycle #6, and the pointer is further incremented by 1 correspondingly to one address.

The second arithmetic unit 30 conducts the same operation as in the cycle #6, and executes calculation of the subsequent elements, a[5]×b[5].

The sixth arithmetic unit 220 conducts the same operation as in the cycle #6, and executes calculation of the subsequent elements, d[5]×e[5].

The third arithmetic unit 130 conducts the same operation as in the cycle #6, and executes calculation of the subsequent elements, a[4]×b[4]+c[4].

The seventh arithmetic unit 230 conducts the same operation as in the cycle #6, and executes calculation of the subsequent elements, d[4]×e[4]+f[4].

The fourth arithmetic unit 200 conducts the same operation as in the cycle #6, and executes subsequent calculation, t1×t2.

The fifth arithmetic unit 210 conducts the same operation as in the cycle #6, and outputs the data received from the fourth arithmetic unit 200.

The third memory 102 conducts the same operation as in the cycle #6, so that a subsequent resultant data g[1] can be stored and the write pointer 162 can be incremented by 1.

In each cycle thereafter, the aforementioned operations are similarly conducted. In the pair of the first control unit 50 and the second memory 100 and the pair of the third control unit 250 and the fourth memory 260, the similar operations are repeated until the values of the pointers become "100", namely, the same as the values of the write pointers.

Also, in the second control unit 120, the processability judgement signal generated by the first control unit 50 is counted up from the cycle #6 to a cycle 105, and when resultant data of 100 cycles, namely, data g[0] through g[99], are stored, the execution of the program is completed.

Furthermore, the first arithmetic unit 20 periodically refers the write pointer 162 of the second control unit 120 at timing predetermined in the execution program, so as to determine whether or not the execution of the program is completed by judging whether or not the value of the write pointer 162 is "100" [S104], [S105].

Specifically, in the [Program 3], the synchronous signal 600 corresponding to the start of data reading is output from the first arithmetic unit 20 to the processability judgement parts of the first control unit 50 and the third control unit 250, and the synchronous signal 600 is referred so as to synchronize the data and the processability judgement signals output from the second memory 100 and the fourth memory 260. In this manner, the two data can be synchronously input to the fourth arithmetic unit 200. Therefore, even when the number of data arrays to be processed is increased, the program can be executed without fail.

Furthermore, since the network 240 disposed among the control units, the memories and the arithmetic units is provided with the bus switches 250 and 260 for connecting or disconnecting the processability judgement signals and the data lines, a larger number of data can be processed.

EMBODIMENT 3

Figure 16:
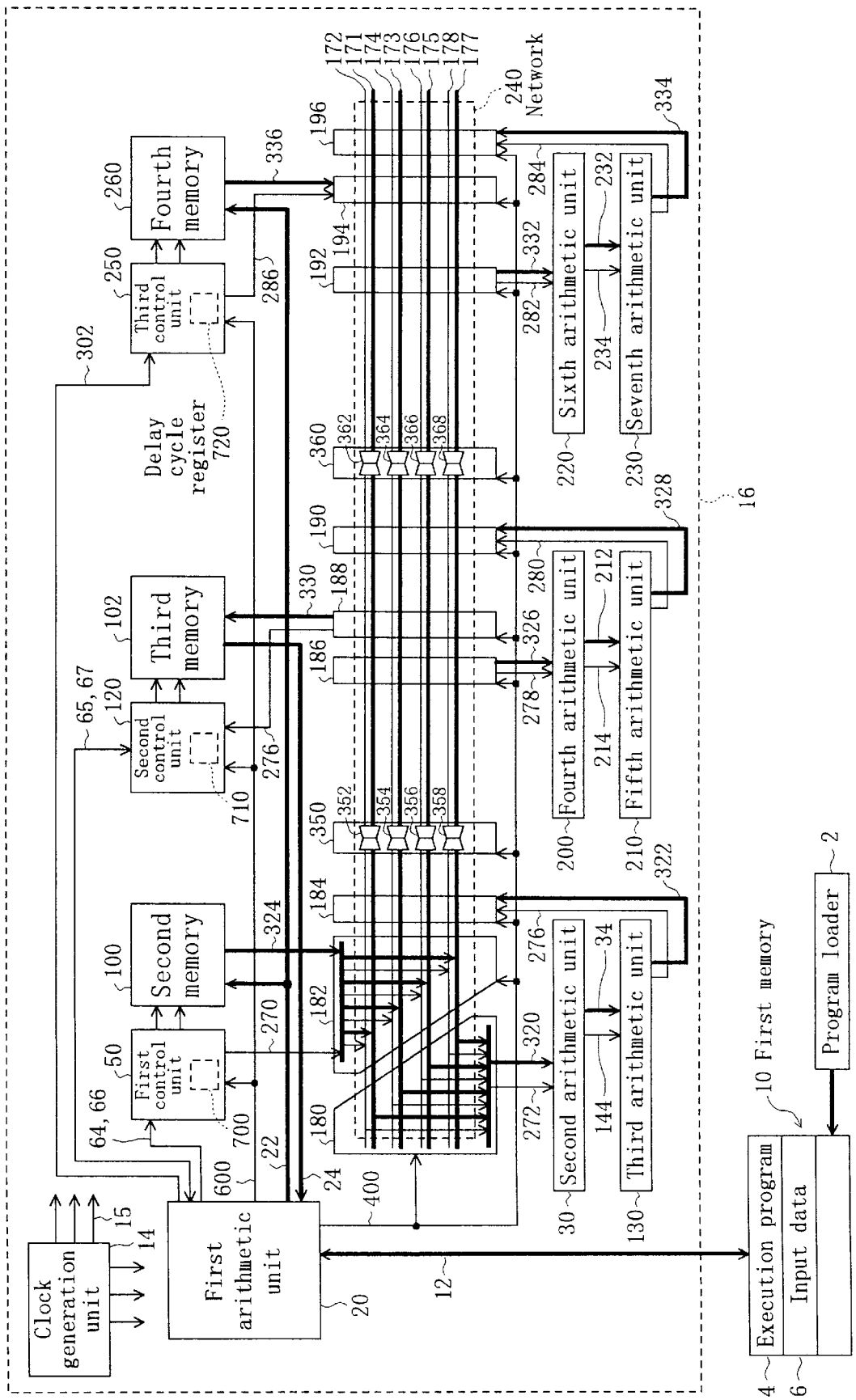
FIG. 16 is a diagram for showing the configuration of a data processor according to a third embodiment of the invention.

FIG. 16 is a diagram for showing a data processor according to a third embodiment of the invention.

This data processor is different from that of the second embodiment in delay cycle registers 700, 710 and 720 for storing a delay cycle to be inserted after outputting the synchronous signal 600 from the first arithmetic unit 20 to the respective control units. Since the delay cycle registers are thus provided, a data output starting cycle can be set independently in each of the control units.

In the third embodiment, the following program is assumed to be executed:

[Program 4]

```
#define DSIZE=100;
main (){
  int iii;
  int a[DSIZE],b[DSIZE],c[DSIZE];
  int d[DSIZE];
  int g[DSIZE];
  int t1,t2;
    for (iii=0; iii<DSIZE; iii++){
      t1=a[iii]*b[iii]+c[iii];
      t2=d[iii];
      g[iii]= t1*t2;
    }
}
```

A difference between this [Program 4] and the above-described [Program 3] is that the number of stages for obtaining resultant data t2 (0 stage) is different from that for obtaining resultant data t1 (2 stages), and hence, it is necessary to provide means for delaying the processing for obtaining the data t1 by the difference of stages (2 stages) for attaining synchronization.

Figure 17:
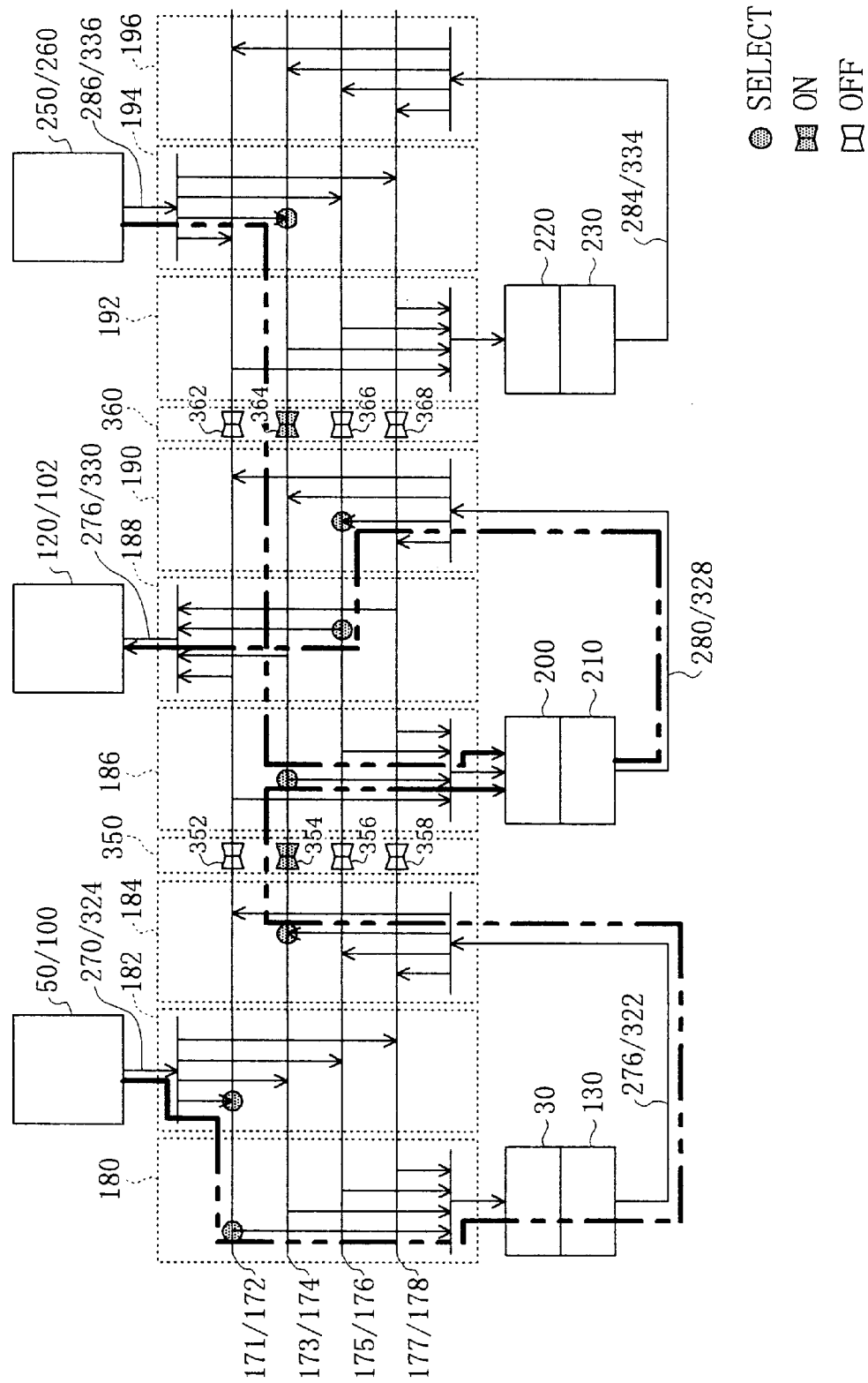
FIG. 17 is a diagram for showing an example of data flow in the data processor of the third embodiment.

FIG. 17 is a diagram for showing data flow in a network formed by a network form line in this embodiment.

In the data processor of FIG. 16, in order to execute the [Program 4], the output bus switch 182 is switched so that signals on the pair of the processability judgement signal 270 of the first control unit 50 and the data line 324 of the second memory 100 can be output to the processability judgement signal 172 and the data line 171 of the network 240, and the input bus switch 180 is switches so that signals can be input to the second arithmetic unit 30 from the processability judgement signal 172 and the data line 172 as is shown in FIG. 17. Also, the output bus switch 184 is switched so that signals on the processability judgement signal 276 and the data line 322 from the third arithmetic unit 130 can be output to the processability judgement signal 174 and the data line 173 of the network 240.

Furthermore, in the bus switches 350, the bus switch 352 is set in an off-state because the first control unit 50, the second memory 100, the second arithmetic unit 30 and the third arithmetic unit 130 individually need data. Also, the bus switch 354 is set in an on-state because resultant data from the third arithmetic unit 130 is required to be output to the fourth arithmetic unit 200.

Moreover, the output bus switch 194 is switched so that signals on the pair of the processability judgement signal 286 of the third control unit 250 and the data line 336 of the fourth memory 260 can be output to the processability judgement signal 174 and the data line 173 of the network 240.

Also, in the bus switches 360, the bus switch 362 is set in an off-state, and the bus switch 364 is set in an on-state because signals on the processability judgement signal 286 of the third control unit 250 and the data line 336 of the fourth memory 260 are required to be output to the fourth arithmetic unit 200.

In addition, the input bus switch 186 is switched so that signals on the processability judgement signal 174 and the data line 173 of the network 240 can be input to the fourth arithmetic unit 200, and the output bus switch 190 is switched so that signals on the processability judgement signal 280 and the data line 328 from the fifth arithmetic unit 210 can be output to the processability judgement signal 176 and the data line 175 of the network 240. Furthermore, the input bus switch 188 is switched so that signals on the processability judgement signal 276 and the data line 330 to the second control unit 120 can be input from the processability judgement signal 176 and the data line 175 of the network 240. In this manner, the aforementioned operation can be conducted.

Figure 18:
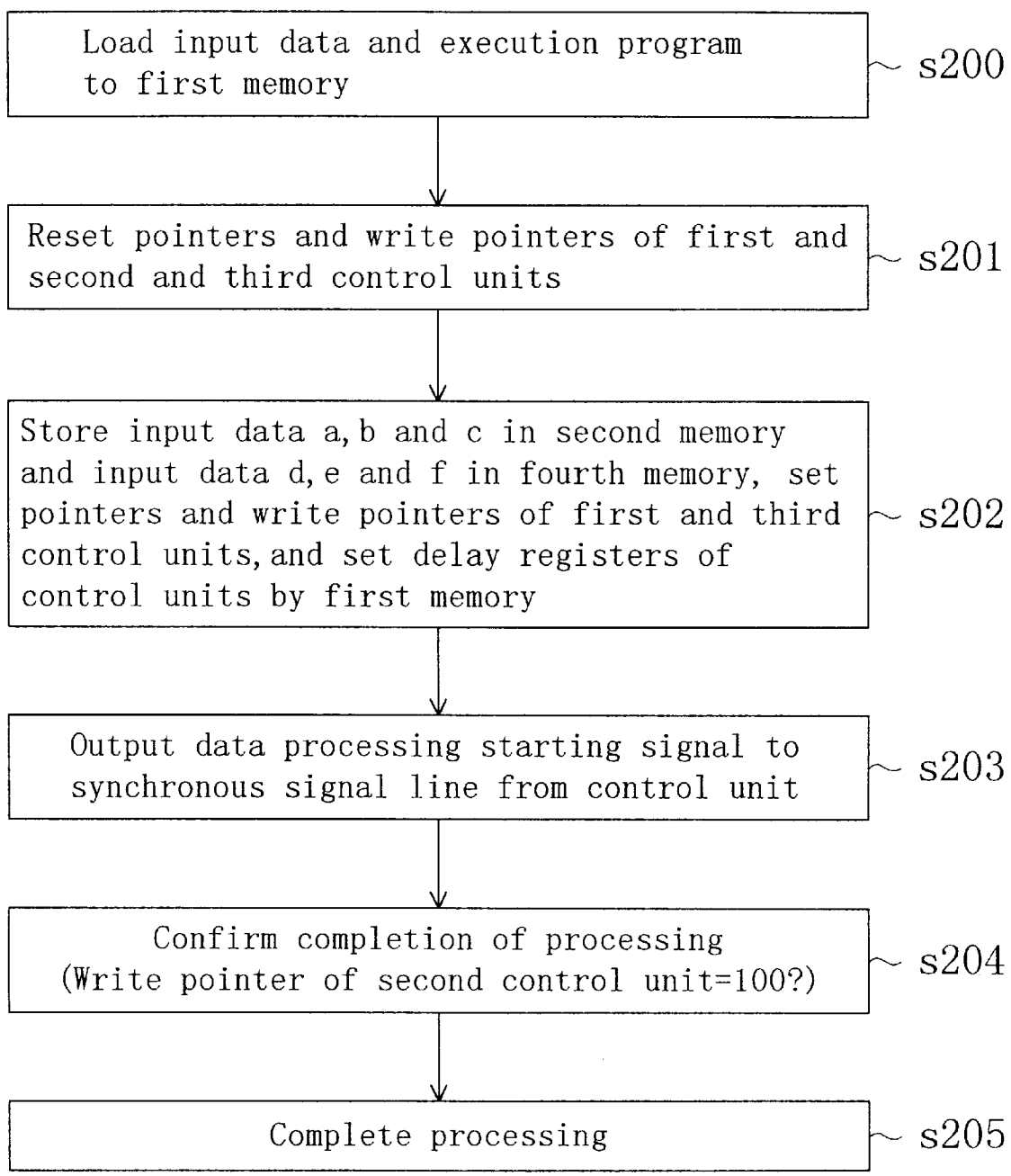
FIG. 18 is a flowchart for showing the operation of a first arithmetic unit in the data processor of the third embodiment.
Figure 19A:
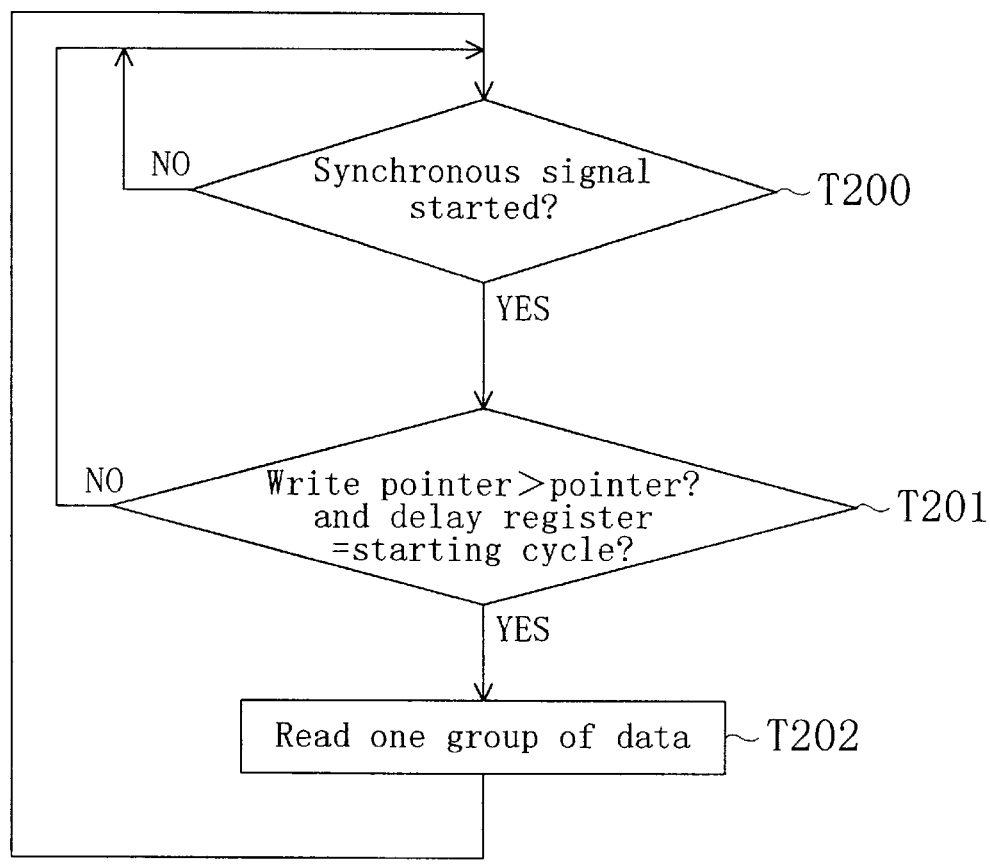
FIG. 19($a$) is a flowchart for showing the operation of a first control unit in the data processor of the third embodiment.
Figure 19B:
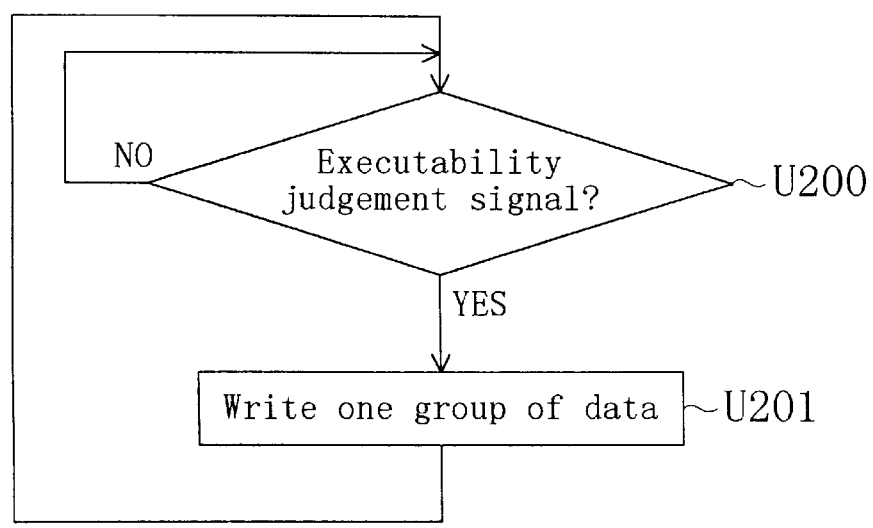
Figure 20:
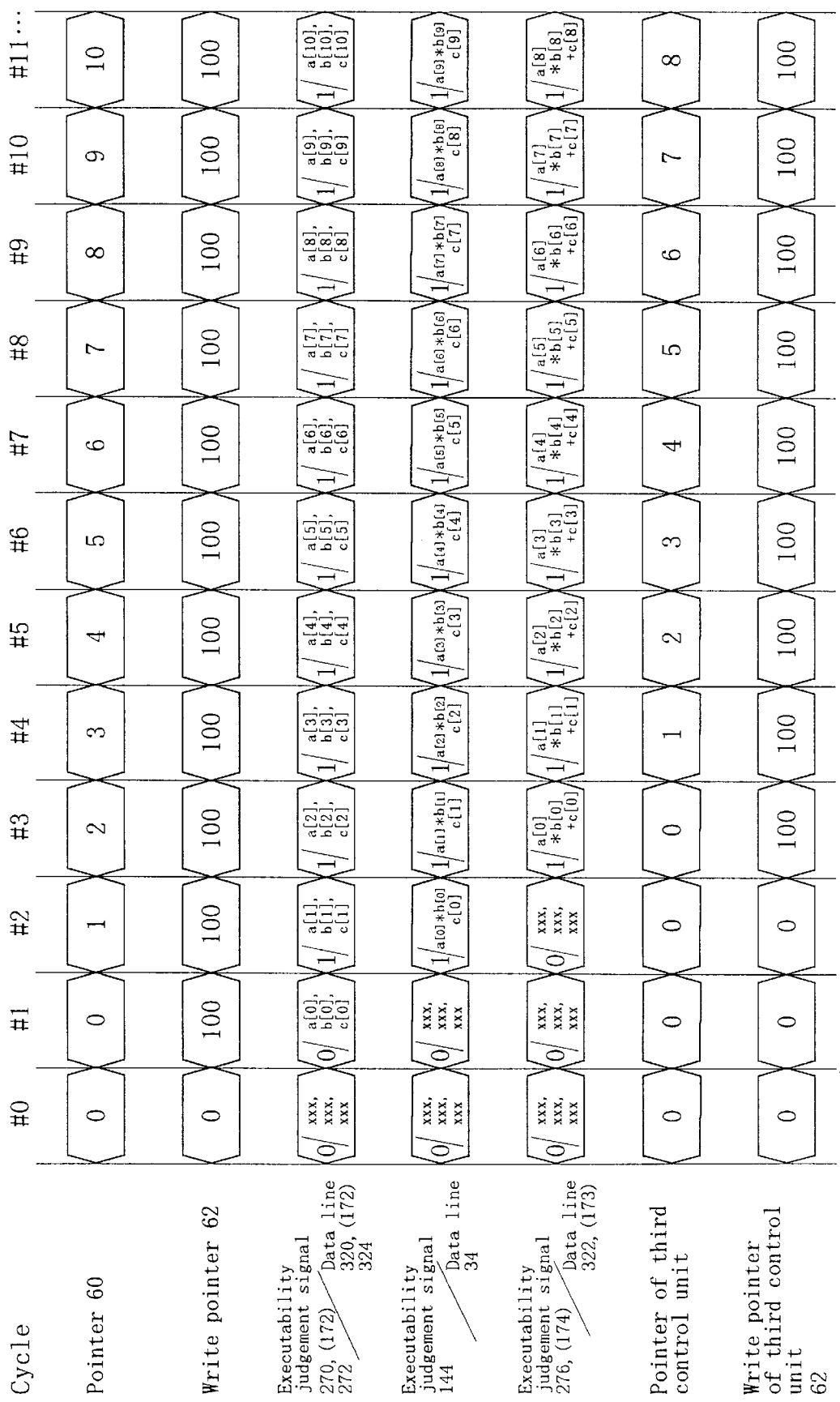
FIG. 20 is an explanatory diagram for showing data values at respective members of the data processor of the third embodiment in the data flow of FIG. 17.
Figure 21:
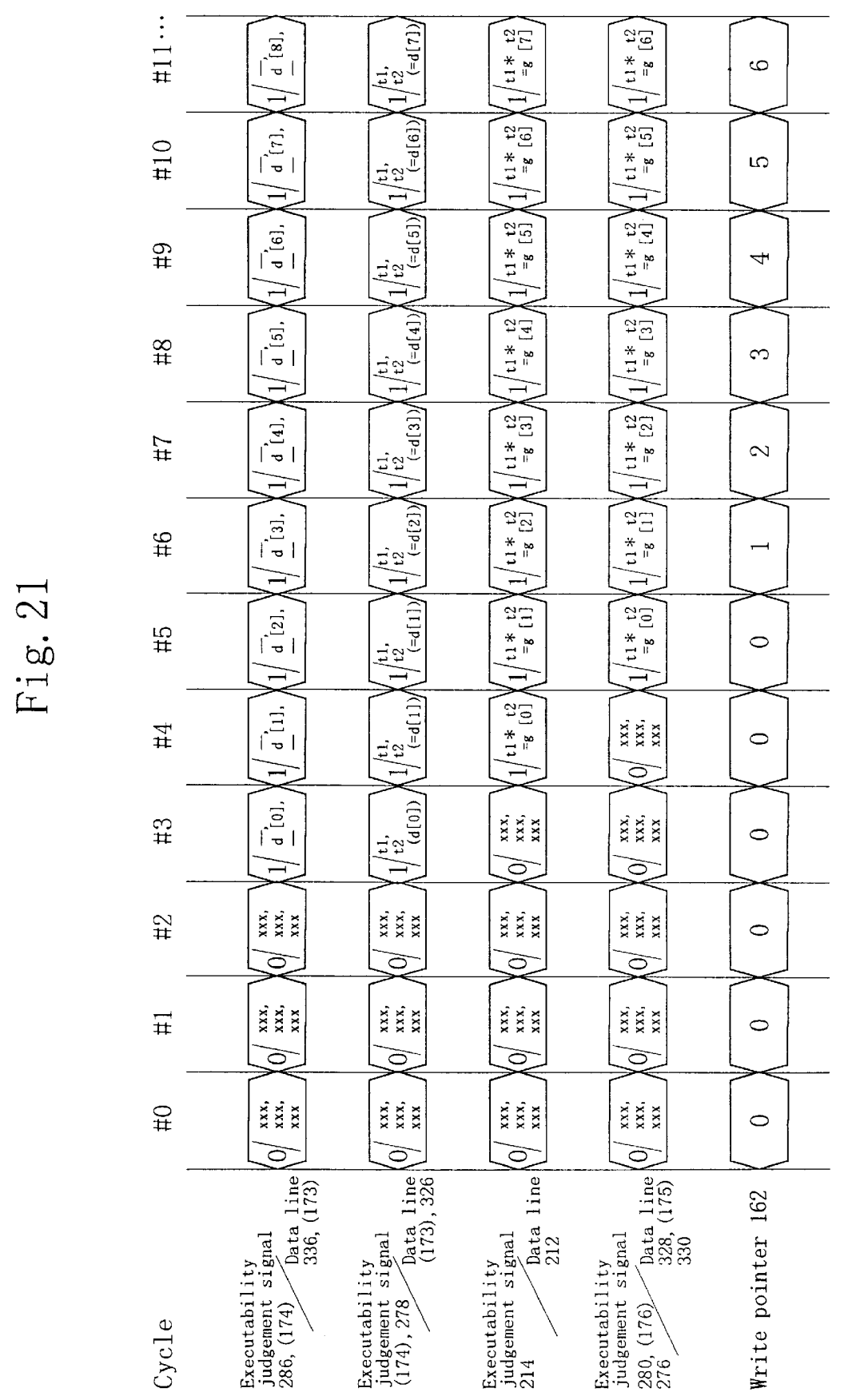

FIGS. 18, 19(a) and 19(b) are diagrams for showing basic flows in the third embodiment, and FIGS. 20 and 21 are diagrams for showing data values at the respective members in executing the [Program 4] in this embodiment.

Now, the third embodiment will be described with reference to FIGS. 16, 17, 18, 19(a), 19(b), 20 and 21.

(Prior to Cycle #0)

The execution program and the input data used in the data processor of this embodiment are previously generated by a compiler or an assembler to be stored in the first memory 10 by the program loader [S200].

Specifically, the input data arrays a, b, c and d are stored in the first memory 10 as the input data 6, and the execution program 4 includes a flow for the operation of this embodiment as described below.

At this pointer, an external processor or the like can be used as the program loader, which is not described in detail because it is not the main part of the invention.

The first arithmetic unit 20 receives the execution program from the first memory 10, and initializes the pointer 60 and the write pointer 62 of the first control unit 50 to "0". The first arithmetic unit 20 receives the execution program from the first memory 10, and initializes the pointer 160 and the write pointer 162 of the second control unit 120 to "0". Furthermore, the first arithmetic unit 20 receives the execution program from the first memory 10, and initializes the pointer and the write pointer of the third control unit 250 to "0". The first arithmetic unit 20 receives the execution program from the first memory 10, and sets the connections of the input bus switches, the output bus switches and the bus switches in the network 240 in accordance with the network form line 400 [S201].

Furthermore, the processability judgement parts of the first control unit 50 and the third control unit 250 refer the values of the pointers, the values of the write pointers to 10and the synchronous signal 600 in each cycle, so as to judge that the second memory 100 and the fourth memory 260 do not store data to be processed and that the processing cannot be started [T200].

Moreover, the processability judgement part 170 of the second control unit 120 receives the processability judgement signal from the third arithmetic unit 130 in each cycle, so as to judge that there is no data to be written [U200].

The first arithmetic unit 20 receives not only the execution program from the first memory 10 but also data of 100 words of the arrays a, b and c from the first memory 10, and successively writes the received data in the second memory 100. Furthermore, the first arithmetic unit 20 sets the write pointer 62 of the first control unit 50 at "100" and the pointer 60 at "0". Moreover, the first arithmetic unit 20 receives not only the execution program from the first memory 10 but also data of 100 words of the array d, writes the received data in the fourth memory 260, and sets the write pointer and the pointer of the third control unit 250 at "100" and "0", respectively.

In addition, the first arithmetic unit 20 receives the execution program from the first memory 10, and stores "0" in the delay cycle register 700 of the first control unit 50 and "2" in the delay cycle register 720 of the third control unit 250 [S202].

(Cycle #0)

The first arithmetic unit 20 receives the execution program from the first memory 10, and outputs a processing start signal to the synchronous signal line [S203].

(Cycle #1)

The first control unit 50 compares the values of the write pointer 62 and the pointer 60 and refers the synchronous signal line, so as to judge that the data can be read because the pointer 60 is set at "0", the write pointer 62 is set at "100", the synchronous signal has been output, and the value of the delay cycle register 700 is "0". Therefore, the first control unit 50 outputs the processability judgement signal to the second memory 100, and also to the second arithmetic unit 30 through the processability judgement signal 172 of the network 240.

The second memory 100 outputs, in response to the processability judgement signal, first data a[0], b[0] and c[0] of the data arrays a, b and c to the data line 171 of the network 240. Also, the pointer 60 is incremented by 1 correspondingly to one element of the array [T200], [T201], [T202]. The operations of the first control unit 50 and the second memory 100 in this cycle are similarly conducted in each cycle thereafter.

The third control unit 250 compares the values of the write pointer and the pointer and refers the synchronous signal line, so as to judge that the starting cycle has been started [T200].

However, although the pointer is set at "0" and the write pointer is set at "100" and the synchronous signal 600 has been output, the delay cycle register 720 of the third control unit 250 is set at "2". Therefore, the third control unit 250 determines that there are further two cycles before the data can be read. At this point, the third arithmetic unit 250 starts counting two cycles before starting the data reading [T201].

(Cycle #3)

The first control unit 50 and the second memory 100 conduct the same operations as in the cycle #1, and the pointer 60 is further incremented by 1 correspondingly to one address.

The third control unit 250 compares the values of the write pointer and the pointer, and further refers the synchronous signal line, so as to judge that the starting cycle has been started [T200].

However, although the pointer is set at "0", the write pointer is set at "100", and the synchronous signal 600 has been output, the delay cycle register 720 of the third control unit 250 is set at "2". Therefore, it determines that there is one cycle before the data can be read [T201].

The second arithmetic unit 30 receives the three data from the second memory 100 through the data line 171 of the network 240, conducts a multiplication, a[0]×b[0], temporarily delays the processability judgement signal 72 from the first control unit 50 by one cycle, and outputs resultant data (a[0]×b[0]), the data c[0] and the delayed processability judgement signal to the third arithmetic unit 130. The operation of the second arithmetic unit 30 in this cycle is also similarly conducted in each cycle thereafter.

(Cycle #3)

The first control unit 50 and the second memory 100 conduct the same operations as in the cycle #2, and the pointer 60 is further incremented by 1 correspondingly to one address.

The third control unit 250 compares the values of the write pointer and the pointer, and further refers the synchronous signal line 600, so as to judge that the starting cycle has been started [T200].

Furthermore, since the starting cycle is determined to have been started because the pointer is set at "0", the write pointer is set at "100" and the synchronous signal 600 has been output, the processability judgement signal is output to the processability judgement signal 174 of the network 240 [T201].

The fourth memory 260 outputs, in response to the processability judgement signal, first data d[0] of the data array d to the data line 173 of the network 240. Also, the pointer of the third control unit 250 is incremented by 1 correspondingly to one element of the array [T202].

The second arithmetic unit 30 conducts the same operation as in the cycle #2, and executes calculation of the subsequent elements, a[1]×b[1].

The third arithmetic unit 130 receives resultant data from the second arithmetic unit 30, conducts an addition, a[0]×b[0]+c[0], temporarily delays the processability judgement signal from the second arithmetic unit 30 by one cycle, and outputs resultant data (a[0]×b[0]+c[0]) and the delayed processability judgement signal to the data line 173 and the processability judgement signal 174 of the network 240.

(Cycle #4)

The first control unit 50 and the second memory 100 conduct the same operations as in the cycle #3, and the pointer 60 is further incremented by 1 correspondingly to one address.

The second arithmetic unit 30 conducts the same operation as in the cycle #3, and executes calculation of the subsequent elements, a[2]×b[2].

The third arithmetic unit 130 conducts the same operation as in the cycle #3, and executes calculation of the subsequent elements, a[1]×b[1]+c[1].

The fourth arithmetic unit 200 simultaneously receives the resultant data t1 (=a[0]×b[0]+c[0]) from the second arithmetic unit 30 through the data line 173 of the network 240, data t2 (=d[0]) from the fourth memory 260 and the processability judgement signals from the corresponding control units, conducts a multiplication, t1×t2, temporarily delays the processability judgement signal by one cycle, and outputs resultant data and the delayed processability judgement signal to the fifth arithmetic unit 210.

At this point, since the synchronous signal 600 is generated in the cycle #0, and data is started to be output immediately in the subsequent cycle because the delay cycle is set at "0" in the second memory 100. Also, the third control unit 250 for controlling the fourth memory 260 is delayed by two cycles. As a result, the data t1 and t2 can be simultaneously input to the fourth arithmetic unit 200 in this cycle.

(Cycle #5)

The first control unit 50 and the second memory 100 conduct the same operations as in the cycle #4, and the pointer 60 is further incremented by 1 correspondingly to one address.

The third control unit 250 and the fourth memory 260 conduct the same operations as in the cycle #4, and the pointer is further incremented by 1 correspondingly to one address.

The second arithmetic unit 30 conducts the same operation as in the cycle #4, and executes calculation of the subsequent elements, a[3]×b[3].

The third arithmetic unit 130 conducts the same operation as in the cycle #4, and executes calculation of the subsequent elements, a[2]×b[2]+c[2].

The fourth arithmetic unit 200 conducts the same operation as in the cycle #4, and executes subsequent calculation, t1×t2.

The fifth arithmetic unit 210 receives the resultant data from the fourth arithmetic unit 200. Since there is no need to conduct an addition with regard to this data, the fifth arithmetic unit 210 delays the processability judgement signal from the fourth arithmetic unit 200 by one cycle, and outputs the data received from the fourth arithmetic unit 200 and the delayed processability judgement signal to the data line 175 and the processability judgement signal 176 of the network 240.

(Cycle #6)

The first control unit 50 and the second memory 100 conduct the same operations as in the cycle #5, and the pointer 60 is further incremented by 1 correspondingly to one address.

The third control unit 250 and the fourth memory 260 conduct the same operations as in the cycle #5, and the pointer is further incremented by 1 correspondingly to one address.

The second arithmetic unit 30 conducts the same operation as in the cycle #5, and executes calculation of the subsequent elements, a[4]×b[4].

The third arithmetic unit 130 conducts the same operation as in the cycle #5, and executes calculation of the subsequent elements, a[3]×b[3]+c[3].

The fourth arithmetic unit 200 conducts the same operation as in the cycle #5, and executes subsequent calculation, t1×t2.

The fifth arithmetic unit 210 conducts the same operation as in the cycle #5, and outputs the data received from the fourth arithmetic unit 200.

The third memory 102 receives the processability judgement signal 176 of the network 240, so as to judge that the data can be written, and writes the resultant data transferred through the data line 175 in an address pointed by the write pointer 162 as a resultant data q[0]. At the same time, the write pointer 162 of the second control unit 50 is incremented by +1.

(Cycle #7)

The first control unit 50 and the second memory 100 conduct the same operations as in the cycle #6, and the pointer 60 is further incremented by 1 correspondingly to one address.

The third control unit 250 and the fourth memory 260 conduct the same operations as in the cycle #6, and the pointer is further incremented by 1 correspondingly to one address.

The second arithmetic unit 30 conducts the same operation as in the cycle #6, and executes calculation of the subsequent elements, a[5]×b[5].

The third arithmetic unit 130 conducts the same operation as in the cycle #6, and executes calculation of the subsequent elements, a[4]×b[4]+c[4].

The fourth arithmetic unit 200 conducts the same operation as in the cycle #6, and executes subsequent calculation, t1×t2.

The fifth arithmetic unit 210 conducts the same operation as in the cycle #6, and outputs the data received from the fourth arithmetic unit 200.

The third memory 102 conducts the same operation as in the cycle #6, so as to store a subsequent resultant data g[1]. The write pointer 162 is incremented by 1.

In each cycle thereafter, the same operations are similarly conducted. The operations of the pair of the first control unit 50 and the second memory 100 and the pair of the third control unit 250 and the fourth memory 260 are repeated until the value of the pointers become "100", namely, the same as that of the write pointers. Also, the second control unit 120 counts up the processability judgement signal generated by the first control unit 50 from the cycle #6 to a cycle 105, and when resultant data of 100 cycles, namely, data g[0] through g[99], are stored, the execution of the program is completed. Furthermore, the first arithmetic unit 20 periodically refers the write pointer 162 of the second control unit 50 at timing predetermined in the execution program, and it is determined whether or not the execution of the program is completed by judging whether or not the value of the write pointer 162 is "100" [S204], [S205].

In this manner, when combinations for conducting the processing in the network are determined, a delay cycle is previously set in a delay cycle register provided to each control unit. Thus, the data can be input at different timing from the respective memories.

According to the third embodiment, any of the above-described principle and the [Program 1] through [Program 3] described in the first and second embodiments can be executed. Therefore, the third embodiment is most flexible in the programmability.

In the aforementioned embodiments, the processability judgement signals 72, 144, 150 and 172 are described as effective data specifying signals, but these processability judgement signals can be regarded as enable signals for the operations (processing) of the arithmetic units 30, 130, 200, 210, 220 and 230.

Also, in the aforementioned embodiments, each of the arithmetic units 30, 130, 200, 210, 220 and 230 has a processing cycle of one cycle, which does not limit the invention. It goes without saying that the processing cycle of each arithmetic unit can be two or more cycles. In this case, the delay part included in each arithmetic unit delays the processability judgement signal (effective data specifying signal) by the number of cycles equal to its own processing cycle. Furthermore, the invention is not limited to the delay of the processability judgement signal in each arithmetic unit. Significantly, at the same time as storage of a result of processing in a data storage unit, a processability judgement signal is input to this data storage unit.

What is claimed is:

1. A data processor comprising:
   a data storage unit for storing data therein;
   a plurality of arithmetic units;
   a network for switching connections between said data storage unit and said arithmetic units;
   a control unit for outputting, in reading the data stored in said data storage unit, an effective data specifying signal representing that the read data is effective; and
   a delay circuit for receiving said effective data specifying signal from said control unit and delaying said received effective data specifying signal by the same number of cycles as a number of cycles passed through after the data has been read from said data storage unit and until processing results are obtained in at least one of said arithmetic units.

2. The data processor of claim 1, wherein said delay circuit includes a plurality of delay parts respectively corresponding to said plurality of arithmetic units,
   each of said delay parts delaying said effective data specifying signal by the same number of cycles as a number of cycles required for an associated one of said arithmetic units to perform processing and outputting the delayed signal.

3. The data processor of claim 1 or 2, wherein said control unit includes:
   a write pointer supplied with a value representing a number of data stored in said data storage unit;
   a pointer successively supplied with a value representing how many times the data has been read from said data storage unit; and
   a judgement part for comparing the value of said write pointer with the value of said pointer and outputting said effective data specifying signal if the value of said pointer is equal to or smaller than the value of said write pointer.

4. The data processor of claim 1 or 2, wherein said effective data specifying signal is a processability judgement signal representing that processable data is present in said storage unit.

5. The data processor of claim 1 or 2, further comprising:
   a main data storage unit in which data has been previously stored;
   one or more other data storage units; and
   a data transfer unit for transferring the data stored in said main data storage unit to said plurality of data storage units,
   wherein said data transfer unit outputs a synchronous signal to said control unit for instructing to read data simultaneously from said plurality of data storage units.

6. The data processor of claim 5, wherein said control unit is provided for each of said data storage units and a number of said control units is equal to a number of said data storage units.

7. The data processor of claim 6, wherein each of said control units includes a delay cycle register for storing a set number of cycles by which reading data is delayed after the synchronous signal has been input,
   whereby reading of data is started when said set number of cycles passes after the synchronous signal has been input.

8. The data processor of claim 1 or 2, wherein a number of stages of data processing performed by said plurality of arithmetic units after the connections have been switched by said network is different from a number of stages of data processing before the connections are switched.

9. The data processor of claim 5, wherein said network switches the connections so that two or more said data storage units output data to an identical one of said arithmetic units.

10. The data processor of claim 5, wherein said network switches the connections so that one of said data storage units outputs data to one of said arithmetic units and processing results obtained by said arithmetic unit and data stored in another one of said data storage units are output to another one of said arithmetic units.

11. The data processor of claim 1 or 2, further comprising a main data storage unit in which data has been previously stored, wherein information about switching of the connections by said network is stored in said main data storage unit.

12. The data processor of claim 1 or 2, wherein said network includes:

an output bus switch to which data and said effective data specifying signal are output from each said data storage unit and each said control unit, respectively; and an input bus switch for inputting the received data and effective data specifying signal to one of said arithmetic units.

13. The data processor of claim 12, wherein said network includes:

a plurality of buses; and a bus switch provided for each of said buses, wherein said bus switch is closed for enabling transfer of data and is opened for disabling the transfer of data.

14. The data processor of claim 1 or 2, wherein said plurality of arithmetic units perform mutually different types of processing.

15. The data processor of claim 1 or 2, further comprising:

another control unit for receiving said effective data specifying signal from one of said arithmetic units performing ultimate processing via said network and outputting a write instruction; and another data storage unit for receiving processing results finally obtained by said arithmetic unit performing the ultimate processing, receiving said write instruction from said another control unit, and storing said finally obtained processing results.

16. The data processor of claim 3, wherein said effective data specifying signal is a processability judgement signal representing that processable data is present in said storage unit.

17. The data processor of claim 7, wherein said network switches the connections so that one of said data storage units outputs data to one of said arithmetic units and processing results obtained by said arithmetic unit and data stored in another one of said data storage units are output to another one of said arithmetic units.

18. The data processor of claim 5, wherein said network includes:

an output bus switch to which data and said effective data specifying signal are output from each said data storage unit and each said control unit, respectively; and an input bus switch for inputting the received data and effective data specifying signal to one of said arithmetic units.

19. The data processor of claim 6, wherein said network includes:

an output bus switch to which data and said effective data specifying signal are output from each said data storage unit and each said control unit, respectively; and an input bus switch for inputting the received data and effective data specifying signal to one of said arithmetic units.

20. The data processor of claim 18, wherein said network includes:

a plurality of buses; and a bus switch provided for each of said buses, wherein said bus switch is closed for enabling transfer of data and is opened for disabling the transfer of data.

21. The data processor of claim 19, wherein said network includes:

a plurality of buses; and a bus switch provided for each of said buses, wherein said bus switch is closed for enabling transfer of data and is opened for disabling the transfer of data.

* * * * *